(12) United States Patent
Erkmen et al.

(10) Patent No.: US 9,231,698 B2
(45) Date of Patent: Jan. 5, 2016

(54) OPTICAL COMMUNICATION TERMINAL

(71) Applicant: Google Inc., Mountain View, CA (US)

(72) Inventors: Baris Ibrahim Erkmen, Mountain View, CA (US); Nam-hyong Kim, San Jose, CA (US); Edward Allen Keyes, Mountain View, CA (US); Kyle Brookes, Redwood City, CA (US)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 14/189,582

(22) Filed: Feb. 25, 2014

(65) Prior Publication Data

US 2015/0244458 A1 Aug. 27, 2015

(51) Int. Cl.
*H04B 10/00* (2013.01)
*H04B 10/112* (2013.01)

(52) U.S. Cl.
CPC .................................. *H04B 10/1129* (2013.01)

(58) Field of Classification Search
CPC .. H04B 10/11; H04B 10/112; H04B 10/1123; H04B 10/1125; H04B 10/1129
USPC .......................... 398/118, 128, 129, 130, 131
See application file for complete search history.

(56) References Cited

U.S. PATENT DOCUMENTS

| 5,390,040 | A | 2/1995 | Mayeux |
| 5,465,170 | A | 11/1995 | Arimoto |
| 5,606,444 | A | 2/1997 | Johnson et al. |
| 6,327,063 | B1 * | 12/2001 | Rockwell ....................... 398/122 |
| 6,819,874 | B2 | 11/2004 | Cheng et al. |
| 7,046,934 | B2 | 5/2006 | Badesha et al. |
| 7,277,641 | B1 | 10/2007 | Gleckman |
| 7,587,141 | B2 | 9/2009 | Fisher et al. |
| 7,627,251 | B2 | 12/2009 | Walther et al. |
| 7,668,468 | B1 | 2/2010 | Lewis et al. |
| 8,639,069 | B1 * | 1/2014 | Helkey et al. ................... 385/18 |

(Continued)

FOREIGN PATENT DOCUMENTS

EP 0977070 A1 2/2000

OTHER PUBLICATIONS

International Searching Authority, International Search Report and Written Opinion for PCT/US2015/012361 mailed Apr. 24, 2015, 12 pages.

(Continued)

*Primary Examiner* — Daniel Dobson
(74) *Attorney, Agent, or Firm* — McDonnel Boehnen Hulbert & Berghoff LLP

(57) ABSTRACT

An optical communication terminal is configured to operate in two different complementary modes of full duplex communication. In one mode, the terminal transmits light having a first wavelength and receives light having a second wavelength along a common free space optical path. In the other mode, the terminal transmits light having the second wavelength and receives light having the first wavelength. The terminal includes a steering mirror that directs light to and from a dichroic element that creates different optical paths depending on wavelength, and also includes spatially separated emitters and detectors for the two wavelengths. A first complementary emitter/detector pair is used in one mode, and a second pair is used for the other mode. The optical components are arranged such that adjusting an orientation of the steering mirror aligns the terminal to communication over a given free space optical link using either the first or second complementary pair.

20 Claims, 10 Drawing Sheets

(56) References Cited

U.S. PATENT DOCUMENTS

| | | |
|---|---|---|
| 2002/0109886 A1 | 8/2002 | Barbier et al. |
| 2004/0258415 A1 | 12/2004 | Boone et al. |
| 2005/0117904 A1 | 6/2005 | Choi et al. |
| 2006/0110163 A1 | 5/2006 | Ngo et al. |
| 2007/0031150 A1 | 2/2007 | Fisher et al. |
| 2011/0274434 A1 | 11/2011 | Cunningham et al. |
| 2014/0248049 A1* | 9/2014 | Saint Georges ................ 398/25 |

OTHER PUBLICATIONS

A. Kern, S. Paul, D. Wahl, A. Al-Samaneh, and R. Michalzik, "Single-Fiber Bidirectional Optical Data Links with Monolithic Transceiver Chips," Adv. Opt. Technol. 2012, 729731 (2012).

K. Park and M. Park, "Single Wavelength, Bi-Directional (SWBiDi) Transmission Technology," OE Solutions white paper, dated 2011 (7 pages).

\* cited by examiner

OPTICAL COMMUNICATION TERMINAL

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly.

Free space optical communication links can be formed between respective communication terminals that send and receive modulated laser light. For example, a first terminal may generate laser light modulated according to output data and transmit the laser light to a second terminal where the laser light is detected and demodulated to recover the data. Similarly, the second terminal may generate laser light modulated according to data and transmit laser light to the first terminal where the laser light is detected and demodulated.

To support full duplex communication in which data can be sent and received simultaneously using a single terminal, configurations may transmit data using a first wavelength and receive data using a second wavelength. The communication terminal can then include a dichroic beam splitter in the optical path from the primary aperture of the terminal. The dichroic beam splitter can allow one of the wavelengths to pass through and reflect the other to thereby separate the light sent/received at the two different wavelengths while sharing a single primary aperture. For instance, a first terminal can be configured to transmit at wavelength 1 and receive at wavelength 2. A dichroic beam splitter may pass wavelength 1 and reflect wavelength 2. A laser light source configured to emit at wavelength 1 can be situated to emit light that passes through the dichroic beam splitter, toward the primary aperture. A photo detector configured to detect at wavelength 2 can be situated to receive light that is reflected by the dichroic beam splitter after being received via the primary aperture. Similarly, a second communication terminal can be configured to transmit at wavelength 2 and receive at wavelength 1. A suitable laser light source and photo detector can be arranged with respect to a dichroic beam splitter to direct light to/from a single primary aperture of the second terminal. As such, the first and second communication terminals can communicate data in either direction simultaneously by sending and receiving modulated laser beams at the two different wavelengths.

To ensure alignment between spatially separated terminals, each terminal generally incorporates one or more adjustable beam steering mirrors that direct laser light to and from the respective transmit/receive apertures to the various laser light sources and photo detectors in each terminal. Adjusting orientations of the beam steering mirror(s) may then adjust the positions of various focal points in the optical path(s) coupling various laser light source(s) and photo detector(s) to the primary aperture. A feedback system may also be used to detect an angle of arrival of incoming laser light (e.g., from another terminal), and use the determined angle as feedback to direct transmitted laser light (e.g., to the other terminal). The optical path between the primary aperture and the various laser light source(s) and/or photo detector(s) may additionally include a variety of filters, mirrors, lenses, apertures, and other optical transmission components as necessary.

SUMMARY

Example embodiments relate to a network of balloons in an aerial communication network. Balloons can be formed of an envelope supporting a payload with a power supply, data storage, and one or more transceivers for wirelessly communicating information to other members of the balloon network and/or to wireless stations located on the ground. The balloons can communicate with one another via free space optical links and may include optical communication terminals that can be configured to operate in two different complementary modes of full duplex communication. In one mode, the terminal transmits light having a first wavelength and receives light having a second wavelength along a common free space optical path. In the other mode, the terminal transmits light having the second wavelength and receives light having the first wavelength. Thus, two such terminals operating in complementary modes, on two different balloons, allow the two balloons to communicate data in both directions simultaneously. To form such optical links between arbitrary balloons to create a mesh network, the terminals can be configured to dynamically switch between the two modes by adjusting an orientation of a steering mirror so as to align the free space optical path with mode-specific light emitters and detectors in the terminal.

For instance, the terminal can include a steering mirror that directs light to and from a dichroic element that creates differentiated paths depending on wavelength, and also includes spatially separated emitters and detectors for the two wavelengths. A first complementary emitter/detector pair is used in one mode, and a second pair is used for the other mode. The optical components are arranged such that adjusting an orientation of the steering mirror aligns the terminal to communication over a given free space optical link using either the first or second complementary pair.

Some embodiments of the present disclosure provide an optical communication terminal. The optical communication can include a beam splitter, one or more light sources, one or more detectors, and a steering mirror. The beam splitter can be configured to transmit light of a first wavelength and to reflect light of a second wavelength. The one or more light sources can be configured to emit light of the first wavelength from a first emission location and to emit light of the second wavelength from a second emission location. The one or more detectors can be configured to detect, at a first detection location, light of the first wavelength, and to detect, at a second detection location, light of the second wavelength. The steering mirror and the beam splitter can be arranged such that, while the steering mirror has a first orientation, (i) light of the first wavelength that is emitted from the first emission location is directed for transmission toward a remote terminal, and (ii) light of the second wavelength that is received from the remote terminal is directed toward the second detection location. The steering mirror and the dichroic beam splitter can be further arranged such that, while the steering mirror has a second orientation, (i) light of the second wavelength that is emitted from the second emission location is directed for transmission toward the remote terminal, and (ii) light of the first wavelength received from the remote terminal is directed toward the first detection location.

Some embodiments of the present disclosure provide a high altitude platform. The high altitude platform can include an envelope, a payload configured to be suspended from the envelope; and an optical communication terminal mounted to the payload. The optical communication terminal can include: (i) a beam splitter configured to transmit light of a first wavelength and to reflect light of a second wavelength; (ii) one or more light sources configured to emit light of the first wavelength from a first emission location and to emit light of the second wavelength from a second emission location; (iii) one or more detectors configured to detect, at a first detection location, light of the first wavelength, and to detect, at a second detection location, light of the second wavelength; and (iv) a steering mirror. The steering mirror and the beam splitter can be arranged such that, while the steering mirror has a first orientation, (i) light of the first wavelength that is emitted from the first emission location is directed for transmission toward a remote terminal, and (ii) light of the second wavelength that is received from the remote terminal is directed toward the second detection location. The steering mirror and the beam splitter can be further arranged such that, while the steering mirror has a second orientation, (i) light of the second wavelength that is emitted from the second emission location is directed for transmission toward the remote terminal, and (ii) light of the first wavelength received from the remote terminal is directed toward the first detection location.

Some embodiments of the present disclosure provide a method. The method can include orienting a steering mirror so as to: (i) direct light of a first wavelength emitted from a first emission location for transmission toward a remote terminal, and (ii) direct incident light of a second wavelength received from the remote terminal toward a second detection location. The method can include conducting full duplex communication in a first mode by: (i) emitting light of the first wavelength from the first emission location, modulated based on output data, and (ii) extracting input data based on light of the second wavelength, detected at the second detection location. The method can include making a determination to switch to conducting full duplex communication in a second mode. The method can include, responsive to making the determination, orienting the steering mirror so as to: (i) direct light of the second wavelength emitted from a second emission location for transmission toward a given direction, and (ii) direct incident light of the first wavelength received from the given direction toward a first detection location. The method can include conducting full duplex communication in the second mode by: (i) emitting light of the second wavelength from the second emission location, modulated based on output data, and (ii) extracting input data based on light of the first wavelength, detected at the first detection location.

Some embodiments of the present disclosure provide means for orienting a steering mirror so as to: (i) direct light of a first wavelength emitted from a first emission location for transmission toward a remote terminal, and (ii) direct incident light of a second wavelength received from the remote terminal toward a second detection location. Some embodiments of the present disclosure provide means for conducting full duplex communication in a first mode by: (i) emitting light of the first wavelength from the first emission location, modulated based on output data, and (ii) extracting input data based on light of the second wavelength, detected at the second detection location. Some embodiments of the present disclosure provide means for making a determination to switch to conducting full duplex communication in a second mode. Some embodiments of the present disclosure provide means for, responsive to making the determination, orienting the steering mirror so as to: (i) direct light of the second wavelength emitted from a second emission location for transmission toward a given direction, and (ii) direct incident light of the first wavelength received from the given direction toward a first detection location. Some embodiments of the present disclosure provide means for conducting full duplex communication in the second mode by: (i) emitting light of the second wavelength from the second emission location, modulated based on output data, and (ii) extracting input data based on light of the first wavelength, detected at the first detection location.

These as well as other aspects, advantages, and alternatives, will become apparent to those of ordinary skill in the art by reading the following detailed description, with reference where appropriate to the accompanying drawings.

DETAILED DESCRIPTION

Figure 1:
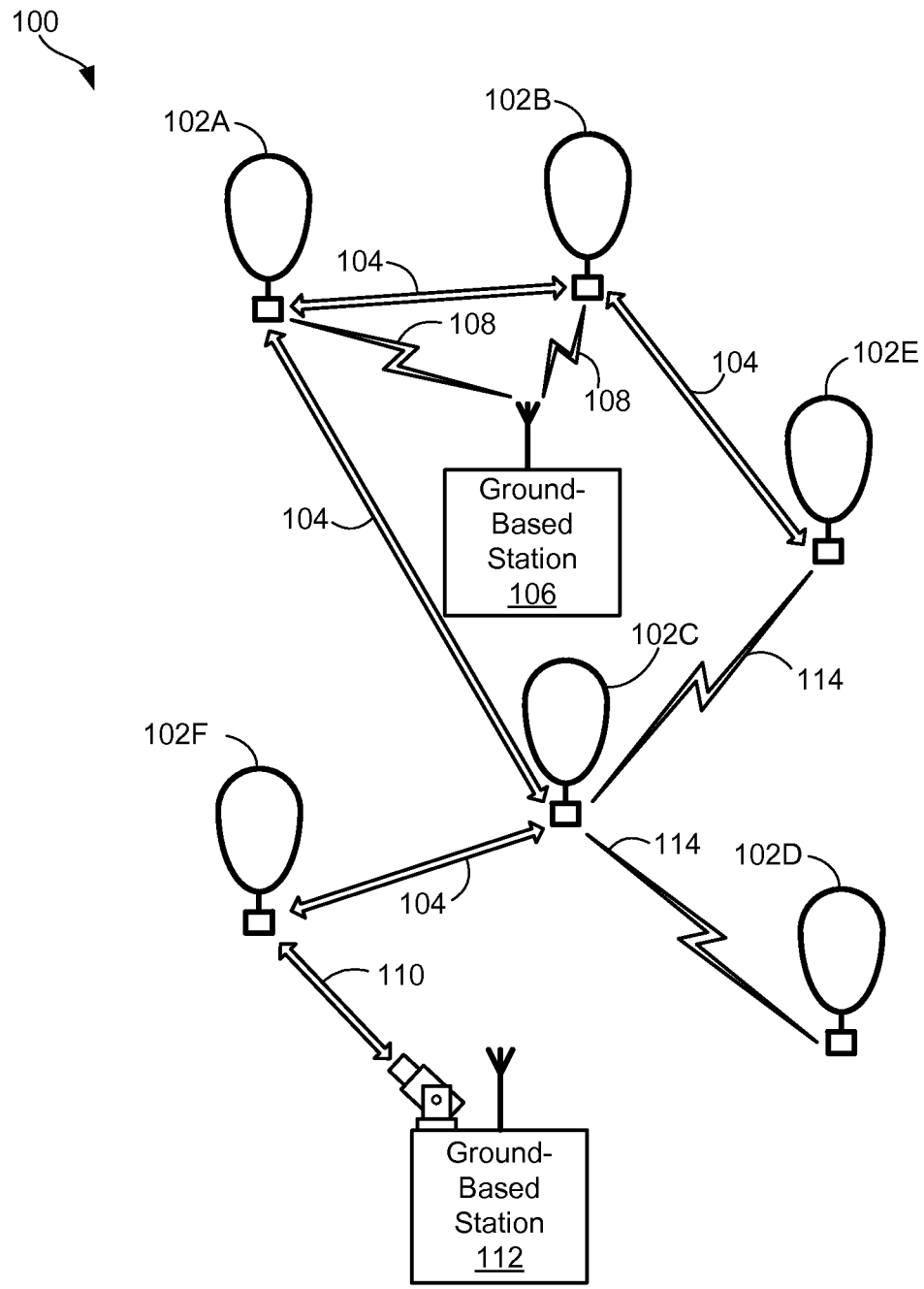
FIG. 1 is a simplified block diagram illustrating an example balloon network.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

1. Overview

Example embodiments relate to an aerial communication network of balloons with communication equipment to facilitate wireless communication with ground-based stations and among the balloons. Balloons can be formed of an envelope supporting a payload with a power supply, data storage, and one or more transceivers for wirelessly communicating information to other members of the balloon network and/or to wireless stations located on the ground.

A network of powered balloons can be situated in the atmosphere and equipped with telecommunications equipment and configured to communicate amongst one another and with terminals on the ground, and perhaps with satellites. The balloons can each serve as terminals in an aerial interconnected network capable of communication amongst one another, with ground-based user equipment, and with data networks on the ground (e.g., the internet) so as to provide user equipment with access to such data networks via the aerial network.

Balloons can communicate with one another over free space optical communication links. Each balloon can be equipped with laser transmitters and detectors, and steerable apertures and optical trains capable of directing laser light emitted from one balloon to a detector on another. To send data from one balloon to another, the laser light from one balloon can be modulated to encode data, the modulated light can be transmitted through the atmosphere, and directed to another balloon in the network, the other balloon can then receive the laser light, and recover the encoded data.

To form a mesh network amongst balloons in the network, each given balloon in the network may send and receive signals between multiple other balloons. In addition, each communication link may allow for bi-directional communications (e.g., balloon one may send signals to balloon two and balloon two may also send signals to balloon one). To efficiently utilize the available resources, each communication link may support full duplex communications by a first balloon transmitting an optical beam to a second balloon while simultaneously receiving a distinguishable optical beam from the second balloon (e.g., using one wavelength to carry communication in one direction and another wavelength to carry communication in the other direction). To effectively communicate in such a full duplex mode, one balloon can be in "mode A," in which data is sent at wavelength 1, $\lambda 1$, and received at wavelength 2, $\lambda 2$; and the other balloon can be in "mode B," in which data is sent at $\lambda 2$ and received at $\lambda 1$. However, as various connections are made over time between different balloons, a given balloon may need to switch modes in order to facilitate full duplex communication with another balloon. That is, a full duplex communication link between two balloons initially in mode A (or two in mode B) is not possible unless one of the balloons switches from A to B (or B to A).

The disclosure herein provides an arrangement for an optical communication terminal in which switching between mode A and mode B is accomplished by changing an alignment of a steering mirror. An example communication terminal includes: a first laser light source configured to emit laser light having a first wavelength from a first emission location, a second laser light source configured to emit laser light having a second wavelength from a second emission location, a first detector configured to detect laser light having the first wavelength incident on a first detection location, and a second detector configured to detect laser light having the second wavelength incident on a second detection location.

A steering mirror directs laser light to and from a primary aperture and a dichroic beam splitter. The dichroic beam splitter substantially transmits laser light having the first wavelength and substantially reflects laser light having the second wavelength to thereby separate the optical paths of the light having the two different wavelengths. The steering mirror can be adjusted from a first approximate orientation, in which the optical terminal is configured to operate in mode A, to a second approximate orientation, in which the optical terminal is configured to operate in mode B. In particular, in the first approximate orientation, laser light having the first wavelength emitted from the first emission location is directed to the primary aperture and laser light having the second wavelength received via the primary aperture is directed to the second detection location. And in the second approximate orientation, laser light having the second wavelength emitted from the second emission location is directed to the primary aperture and laser light having the first wavelength received via the primary aperture is directed to the first detection location.

An orientation feedback sensor can be used to estimate an orientation of the steering mirror, and then adjustments can be made based on the estimated orientation. The orientation feedback sensor can include a beam splitter that diverts some light reflected by the steering mirror (from the primary aperture) to an array of photo-sensitive elements, which can be used to measure the intensity of light illuminating the array. A controller can be used to identify a centroid position of the light illuminating the array, and adjust the steering mirror to cause the centroid position to move toward a target location corresponding to the first or second orientations, depending on the mode of operation. The first and second approximate orientations, and corresponding target locations on the photo-sensitive array may be determined in part during a calibration routine, for example. Because the steering mirror is used to direct both received light from the primary aperture, and transmitted light from the laser light source(s), the laser light transmitted from the terminal can be aligned toward the source of the receive light (e.g., a primary aperture of the other terminal).

In another example, the alignment laser light may be laser light with a third wavelength different from the wavelengths used to carry communications. In that case, the alignment laser light may be directed toward the photo-sensitive array using a dichroic beam splitter that reflects the alignment laser light while transmitting the data carrying laser wavelengths. Moreover, such a dichroic beam splitter may reflect the two data-carrying laser wavelengths and transmit the alignment laser wavelength.

To operate in mode A (transmit $\lambda 1$, receive $\lambda 2$), the terminal can activate the laser light source that emits modulated laser light at $\lambda 1$ and the photo detector that detects laser light at $\lambda 2$, and orient the steering mirror in the first orientation. And to operate in mode B (transmit $\lambda 2$, receive $\lambda 1$), the terminal can activate the laser light source that emits modulated laser light at $\lambda 2$ and the photo detector that detects laser light at $\lambda 1$, and orient the steering mirror in the second orientation. Switching between modes can be performed by adjusting the orientation of the steering mirror and activating/deactivating the appropriate lasers and detectors.

Each of these specific methods and systems are contemplated herein, and several example embodiments are described below.

2. Example Systems

FIG. 1 is a simplified block diagram illustrating a balloon network 100, according to an example embodiment. As shown, balloon network 100 includes balloons 102A to 102F, which are configured to communicate with one another via free-space optical links 104 (e.g., by sending and receiving optical radiation encoded with data). Moreover, while referred to as "optical," communication on the optical links 104 may be carried out with radiation at a range of wavelengths including radiation outside the visible spectrum, such as infrared radiation, ultraviolet radiation, etc. Balloons 102A to 102F could additionally or alternatively be configured to communicate with one another via radio frequency (RF) links 114 (e.g., by sending and receiving radio frequency radiation encoded with data). Balloons 102A to 102F may collectively function as a mesh network for packet-data communications.

Further, at least some balloons (e.g., 102A and 102B) may be configured for RF communications with a ground-based station 106 via respective RF links 108. Further, some balloons, such as balloon 102F, could be configured to communicate via optical link 110 with a suitably equipped ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km above the surface of the Earth. At the poles, the stratosphere starts at an altitude of approximately 8 km. In an example embodiment, high-altitude balloons may be generally configured to operate in an altitude range within the stratosphere that has relatively low wind speed (e.g., between 8 and 32 kilometers per hour (kph)).

More specifically, in a high-altitude balloon network, balloons 102A to 102F may generally be configured to operate at altitudes between 18 km and 25 km (although other altitudes are possible). This altitude range may be advantageous for several reasons. In particular, this altitude region of the stratosphere generally has relatively desirable atmospheric conditions with low wind speeds (e.g., winds between 8 and 32 kph) and relatively little turbulence. Further, while winds between altitudes of 18 km and 25 km may vary with latitude and by season, the variations can be modeled with reasonably accuracy and thereby allow for predicting and compensating for such variations. Additionally, altitudes above 18 km are typically above the maximum altitude designated for commercial air traffic.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical detectors, such as avalanche photo diodes.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include one or more downlink balloons, which could provide a high-capacity air-ground link to connect the balloon network 100 to ground-based network elements.

For example, in balloon network 100, balloon 102F is configured as a downlink balloon. Like other balloons in an example network, the downlink balloon 102F may be operable for optical communication with other balloons via optical links 104. However, the downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, the downlink balloon 102F may additionally be operable for RF communication with ground-based stations 106. In other cases, the downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for wireless communication via RF links and/or optical links with corresponding transceivers situated on balloons in the balloon network 100. Further, a ground-based station may use various air-interface protocols to communicate with balloons 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the present disclosure.

In a further aspect, some or all of balloons 102A to 102F could be additionally or alternatively configured to establish a communication link with space-based satellites. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks for communicating information. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath. Each intermediate balloon (i.e., hop) along a particular lightpath may act as a repeater station to first detect the incoming communication via received optical signals and then repeat the communication by emitting a corresponding optical signal to be received by the next balloon on the particular lightpath. Additionally or alternatively, a particular intermediate balloon may merely direct incident signals toward the next balloon, such as by reflecting the incident optical signals to propagate toward the next balloon.

To operate as a mesh network, balloons 102A to 102F may employ various routing techniques and self-healing algorithms. In some embodiments, the balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network 100.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, the balloon network 100 may be configured as a transparent mesh network. More specifically, in a transparent mesh network configuration, the balloons may include components for physical switching that are entirely optical, without any electrical components involved in the routing of optical signals. Thus, in a transparent configuration with optical switching, signals can travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in the balloon network 100 may implement wavelength division multiplexing (WDM), which may be used to increase link capacity. When WDM is implemented with transparent switching, it may be necessary to assign the same wavelength for all optical links on a given lightpath. Lightpaths in transparent balloon networks are therefore said to be subject to a "wavelength continuity constraint," because each hop in a particular lightpath may be required to use the same wavelength.

An opaque configuration, on the other hand, may avoid such a wavelength continuity constraint. In particular, balloons in an opaque balloon network may include OEO switching systems operable for wavelength conversions along a given lightpath. As a result, balloons can convert the wavelength of an optical signal at one or more hops along a particular lightpath.

Moreover, some example mesh networks may utilize both optical links and RF links. For example, communication pathway through the mesh network may involve one or more hops on optical links, and one or more hops on RF links. RF links may be used, for instance, between relatively proximate balloons in the network.

2b) Control of Balloons in a Balloon Network

Figure 2:
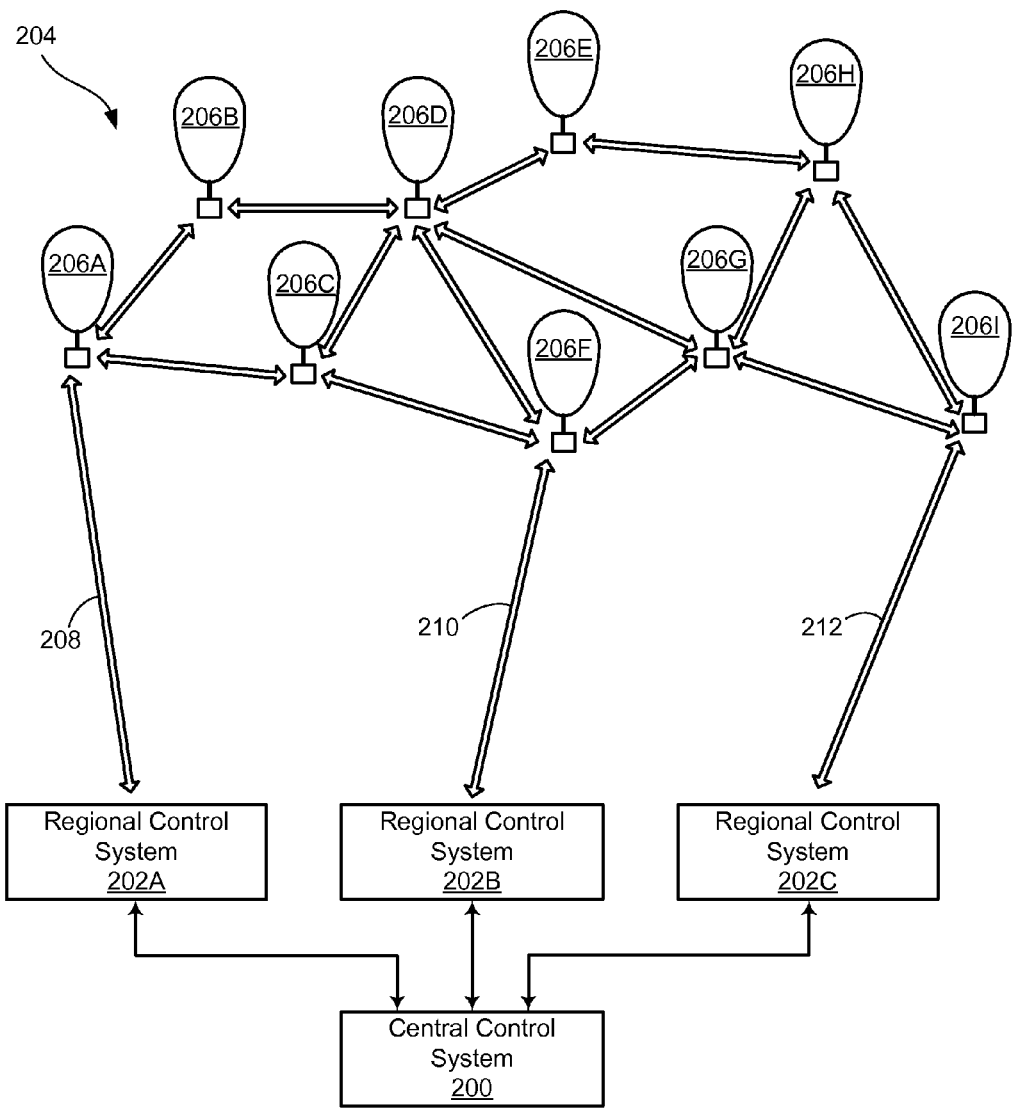
FIG. 2 is a block diagram illustrating an example balloon-network control system.

In some embodiments, mesh networking and/or other control functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 208, 210, and 212, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon. Moreover, a balloon network may additionally or alternatively include satellite link balloons which communicate with a central control system and/or data transport networks via connection with a satellite network, which may involve, for example, communication over free space optical links with satellites in a communication network orbiting above the balloon network.

The regional control systems 202A to 202C may be particular types of ground-based stations that are configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network 204.

Based in part on the overall state of the network 204, the control system 200 may then be used to coordinate and/or facilitate certain mesh-networking functions, such as determining lightpaths for connections, for example. The central control system 200 may determine a current topology (or spatial distribution of balloons) based on the aggregate state information from some or all of the balloons 206A to 206I. The topology may indicate the current optical links that are available in the balloon network and/or the wavelength availability on such links. The topology may then be sent to some or all of the balloons so that individual balloons are enabled to select appropriate lightpaths (and possibly backup lightpaths) for communications through the balloon network 204 as needed.

In a further aspect, the central control system 200 (and possibly regional control systems 202A to 202C as well) may also coordinate certain positioning functions for balloon network 204 to achieve a desired spatial distribution of balloons. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself (e.g., by processing systems situated on payloads of one or more balloons in the network 204). For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement balloon-positioning functions that only consider nearby balloons. In particular, each balloon may determine how to move (and/or whether to move) based on its own state and the states of nearby balloons. The balloons may use an optimization routine (e.g., an energy function) to determine respective absolute and/or relative target positions for each. The respective balloons can then move toward their respective target positions, for example, with respect to the nearby balloons, without necessarily considering the desired topology of the network as a whole. However, when each balloon implements such a position determination routine, the balloon network as a whole may maintain and/or move towards the desired spatial distribution (topology).

2c) Example Balloon Configuration

Figure 3:
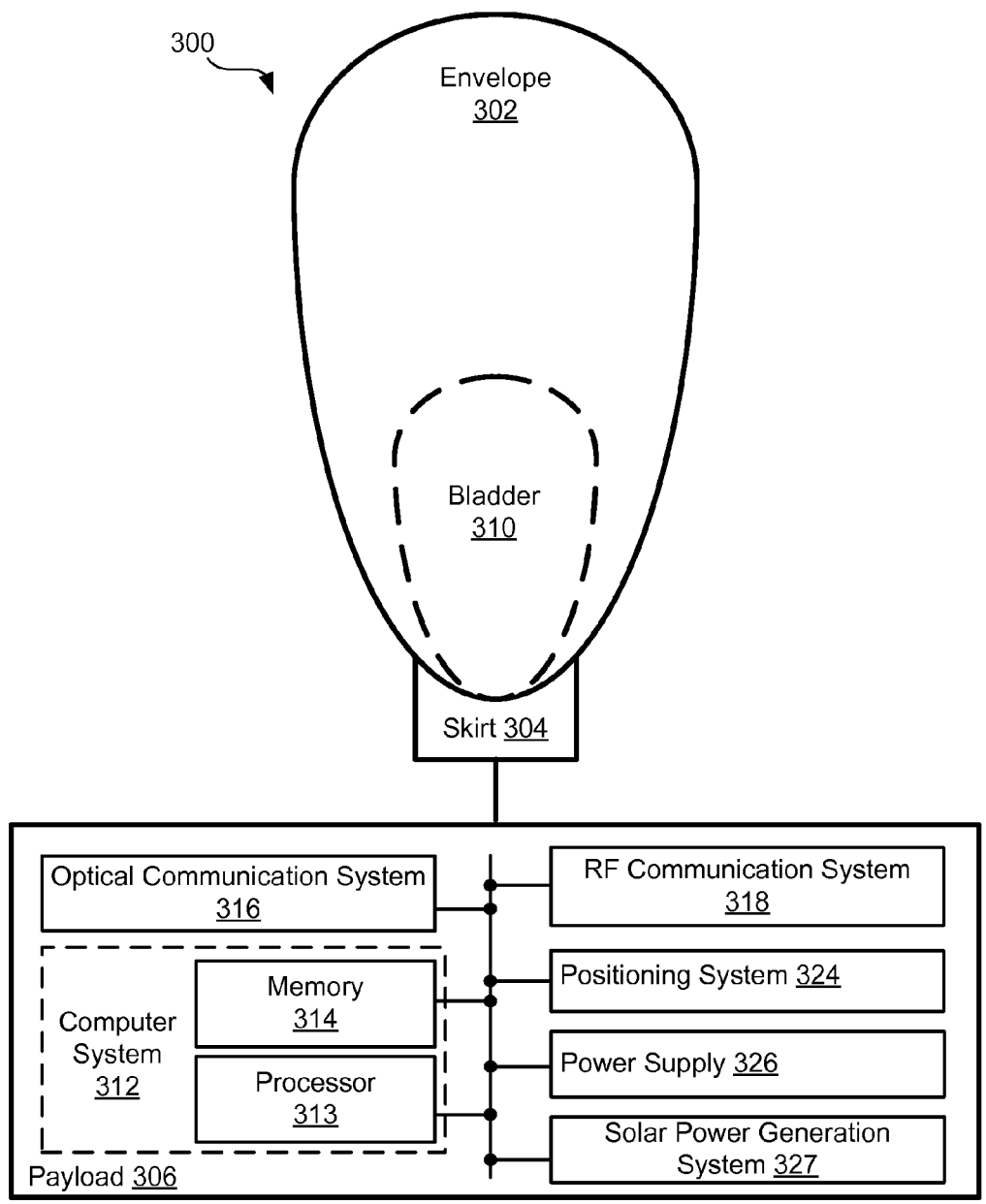
FIG. 3 is a simplified block diagram illustrating an example high-altitude balloon.

Various types of balloon systems may be incorporated in an example balloon network. As noted above, an example embodiment may utilize high-altitude balloons that operate in an altitude range between 18 km and 25 km. FIG. 3 illustrates a high-altitude balloon 300, according to an example embodiment. As shown, the balloon 300 includes an envelope 302, a skirt 304, and a payload 306, which is shown as a block diagram.

The envelope 302 and skirt 304 may take various forms, which may be currently well-known or yet to be developed. For instance, the envelope 302 and/or skirt 304 may be made of metallic and/or polymeric materials including metalized Mylar or BoPet. Additionally or alternatively, some or all of the envelope 302 and/or skirt 304 may be constructed from a highly-flexible latex material or a rubber material such as chloroprene. Other materials are also possible. The envelope 302 may be filled with a gas suitable to allow the balloon 300 to reach desired altitudes in the Earth's atmosphere. Thus, the envelope 302 may be filled with a relatively low-density gas, as compared to atmospheric mixtures of predominantly molecular nitrogen and molecular oxygen, to allow the balloon 300 to be buoyant in the Earth's atmosphere and reach desired altitudes. Various different gaseous materials with suitable properties may be used, such as helium and/or hydrogen. Other examples of gaseous materials (including mixtures) are possible as well.

The payload 306 of balloon 300 may include a computer system 312 having a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system and/or laser system, and which may receive optical signals via an optical-communication receiver (e.g., a photodiode receiver system). Further, payload 306 may include an RF communication system 318, which may transmit and/or receive RF communications via an antenna system.

The payload 306 may also include a power supply 326 to supply power to the various components of balloon 300. The power supply 326 could include a rechargeable battery or other energy storage devices. The balloon 300 may include a solar power generation system 327. The solar power generation system 327 may include solar panels and could be used to generate power that charges and/or is distributed by the power supply 326. In other embodiments, the power supply 326 may additionally or alternatively represent other means for generating and/or supplying power.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses). The positioning system 324 may additionally or alternatively include one or more video and/or still cameras, and/or various sensors for capturing environmental data indicative of the geospatial position of the balloon 300, which information may be used by the computer system 312 to determine the location of the balloon 300.

Some or all of the components and systems within payload 306 may be implemented in a radiosonde or other probe, which may be operable to measure environmental parameters, such as pressure, altitude, geographical position (latitude and longitude), temperature, relative humidity, and/or wind speed and/or wind direction, among other information.

As noted, balloon 300 may include an ultra-bright LED system for free-space optical communication with other balloons. As such, optical communication system 316 may be configured to generate an optical signal indicative of output data by modulating light from an LED and/or laser. The optical signal can then be transmitted as a highly directional, collimated beam in free space toward a receptive terminal (on another balloon), where data can be extracted from the optical signal. Similarly, the optical communication system 316 can also receive an incoming beam of an optical signal from another terminal. The optical communication system 316 can then detect modulation of the received optical signal and extract input data therefrom. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid container holding liquefied and/or gaseous material that is pressurized in excess of the pressure outside the bladder 310. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other gaseous material with density less than typical atmospheric gas (i.e., "lighter-than-air" gasses). The envelope 302 could thus have an associated upward buoyancy force based on its displacement. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or formed of a first material different from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun to selectively heat/cool the gas within the envelope 302 and thereby adjust the density of such gas.

Further, a balloon 306 may include a navigation system (not shown). The navigation system may implement positioning functions to maintain position within and/or move to a position in accordance with a desired spatial distribution of balloons (balloon network topology). In particular, the navigation system may use altitudinal wind data to determine altitudinal adjustments that result in the wind carrying the balloon in a desired direction and/or to a desired location. The altitude-control system may then make adjustments to the density of the balloon envelope 302 to effect the determined altitudinal adjustments and thereby cause the balloon 300 to move laterally to the desired direction and/or to the desired location. Additionally or alternatively, desired altitudinal adjustments may be computed by a ground-based or satellite-based control system and communicated to the balloon 300. In other embodiments, specific balloons in a balloon network may be configured to compute altitudinal adjustments for other balloons and transmit the adjustment commands to those other balloons.

Several example implementations are described herein. It will be understood that there are many ways to implement the devices, systems, and methods disclosed herein. Accordingly, the following examples are not intended to limit the scope of the present disclosure.

3. Full Duplex Optical Communication

Figure 4A:
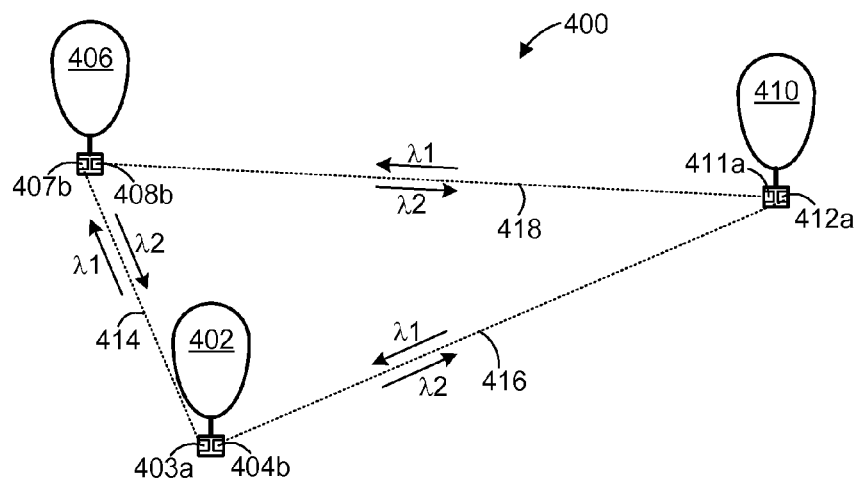
FIG. 4A is a diagram of a network of balloons communicating with one another via free space optical links.

FIG. 4A is a diagram of a network 400 of balloons communicating with one another via free space optical links. The network 400 includes a first balloon 402 with multiple optical communication terminals 403a, 404b; a second balloon 406 with multiple optical communication terminals 407b, 408b; and a third balloon 410 with multiple optical communication terminals 411a, 412a. To form a mesh network amongst balloons in the network 400, each given balloon 402, 406, 410 in the network may send and receive optical signals between one another. Thus, the first balloon 402 and second balloon 406 can communicate by exchanging data modulated optical signals between respective terminals 403a and 406b along lightpath 414. Lightpath 414 is a free space optical pathway along which optical signals propogate between the two balloons 402, 406, and particularly between the terminals 403a, 407b. Similarly, the first balloon 402 and the third balloon 410 communicate by exchanging data modulated optical signals between respective terminals 404b and 412a along lightpath 416. And the second balloon 406 and the third balloon 410 communicate by exchanging data modulated optical signals between respective terminals 408b and 411a along lightpath 418.

Each of the optical communication links in network 400 allow for bi-directional communication using wavelength division to distinguish between transmitted signals and received signals. For example, over lightpath 414, balloon 402 may send data to balloon 406 using light having a first wavelength, $\lambda 1$, and balloon 406 may also send data to balloon 402 using light having a second wavelength, $\lambda 2$. As such, data can be transmitted in both directions simultaneously over the same lightpath 414, and the two terminals 403a, 407b can employ wavelength-selective optics, such as dichroic beam splitters, filters, etc., to separate the light at $\lambda 1$ and $\lambda 2$, and detect the modulation of received signals. The two terminals 403a, 407b can also include wavelength-specific light sources, such as laser diodes and/or lasers that are configured to emit data modulated light at either from the transmitted signals $\lambda 1$ or $\lambda 2$. Thus, the optical communication terminal 403a is configured to emit light at wavelength $\lambda 1$ that is indicative of output data and to simultaneously detect light at wavelength $\lambda 2$ that is indicative of input data. In a complementary fashion, the optical communication terminal 407b is configured to emit light at $\lambda 2$ that is indicative of output data and to simultaneously detect light at $\lambda 1$ that is indicative of input data. In combination then, the optical communication terminals 403a, 407b form a complementary pair that allow for bi-directional (full duplex) data communication between the balloons 402, 406 over lightpath 414.

To facilitate full duplex communications between two arbitrary balloons, it is therefore generally necessary for the two balloons to have a complementary pair of terminals (i.e., one that transmits at $\lambda 1$ and receives at $\lambda 2$, and another that transmits at $\lambda 2$ and receives at $\lambda 1$). The two complementary modes of such optical communication terminals to enable full duplex communication may be referred to as "mode A" and "mode B" for convenience in the description herein. In mode A, a given terminal transmits light at $\lambda 1$ and receives light at $\lambda 2$. In mode B, a given terminal transmits at $\lambda 2$ and receives light at $\lambda 1$. Thus, the terminal 403a is a mode A terminal, while the terminal 407b is a mode B terminal.

Similarly, the communication link between balloons 402 and 410 over lightpath 416 is terminated by terminal 404b, which transmits at $\lambda 2$ and receives light at $\lambda 1$ (and is therefore a mode B terminal), and terminal 412a, which transmits at $\lambda 1$ and receives light at $\lambda 2$ (and is therefore a mode A terminal). And the communication link between balloons 406 and 410 over lightpath 418 is terminated by terminal 408b, which transmits at $\lambda 2$ and receives light at $\lambda 1$ (and is therefore a mode B terminal), and terminal 411a, which transmits at $\lambda 1$ and receives light at $\lambda 2$ (and is therefore a mode A terminal). Each of the complementary pairs of optical communication terminals therefore allow each of the balloons 402, 406, 410 to conduct full duplex communications between one another.

Figure 4B:
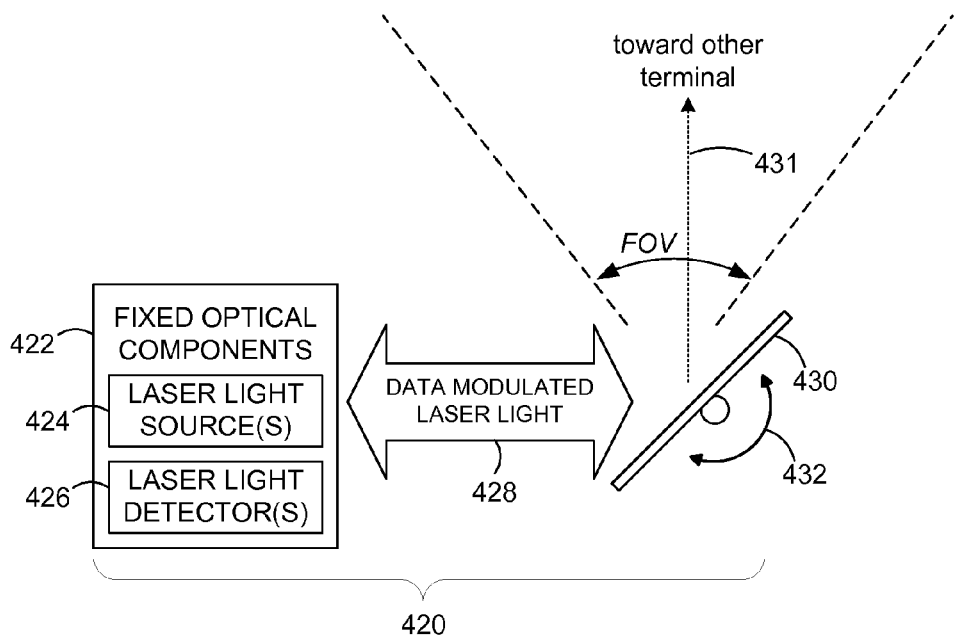
FIG. 4B is a simplified block diagram of an optical communication terminal.

FIG. 4B is a simplified block diagram of an optical communication terminal 420. The optical communication terminal 420 may be any of the individual terminals 403a, 404b, 407b, 408b, 411a, 412a. The optical communication terminal 420 includes a steering mirror 430 arranged to direct data modulated laser light 428 to and from fixed optical components 422 along a light path 431 toward another terminal (e.g., on another balloon in network 400). The fixed optical components 422 and steering mirror 430 may be mounted to a frame or other structural feature so as to substantially fix the relative positions of the various optical components 422 and the steering mirror.

The steering mirror 430 may be a reflective surface with an adjustable orientation that is configured to direct incoming (and outgoing) light from (and to) various directions spanning a field of view (the region labelled FOV) of the terminal 420. The steering mirror may be rotatably mounted and include adjustable mechanical components (e.g., stepper motors, etc.) that cause the reflective surface to pivot with respect to an axis of rotation. The fixed optical components 422 include one or more laser light sources 424 for emitting data modulated light and one or more laser light detectors 426, for detecting received light. Signals from the detector(s) 426 can then be used to extract incoming data in accordance with the modulation of the received light. A modem may be used to map output data to data modulated laser light and also to map data modulated received light to input data.

The fixed optical components 422 direct emitted light from the laser light source(s) 424 toward the steering mirror 430 so as to transmit data modulated laser light along direction 431

(e.g., a lightpath toward another terminal). The optical components 422 are also configured to receive incoming light along the same optical axis and direct the incoming light to the laser light detector(s) 426. Because the fixed optical components 422 provide a shared optical pathway for both incoming and outgoing data modulated light 428, the steering mirror 430 can be used to direct emitted light to be transmitted in direction 431 and also to direct incoming light from direction 431 to the detector(s) 426. Moving the orientation of the steering mirror 430, as shown by directional arrow 432, changes the direction of reflected light to enable the optical communication terminal 420 to conduct communication with a terminal in another direction within the field of view FOV. In practice, the steering mirror 430 may be configured to pivot/rotate about multiple axes so as to provide a field of view that extends along both an azimuthal angle and an elevation angle. For example, the optical communication terminal 420 may be mounted to a payload of a balloon such that the data modulated laser light 428 passing in/out of the fixed optical components 422 is directed vertical (e.g., approximately normal to the surface of the Earth), and the steering mirror 430 is oriented at approximately 45 degrees to reflect light between balloons at similar altitudes. From the perspective of the optical terminal 420, adjusting the tilt angle of the steering mirror can then provide different elevation angles, and rotating the steering mirror 430 about an axis parallel to the direction of the data modulated laser light 428 can provide different azimuthal angles.

In addition to the light source(s) 424 and the light detector(s) 426, the optical communication terminal 420 may also include a variety of optical elements (e.g., lenses, filters, reflectors, fibers, apertures, etc.) aligned to provide optical pathway and a controller implemented with one or more hardware, software, and/or firmware implemented modules. The controller can be configured to encode data into transmitted laser light, decode data from received laser light, adjust the orientation of the steering mirror to align transmitted/received light with a particular lightpath, etc. Feedback sensors that indicate the orientation of the steering mirror 430 may also be included, such as linear encoders and/or angle of arrival sensors that detect the angle or received light via illumination of a photo-sensitive array.

Over time, the configuration of network 400 may be rearranged for a variety of reasons. As the positions of the balloon change relative to one another, new optical communication links may be formed to accommodate a new configuration. Moreover, the population of balloons in the network 400 may change over time, as balloons are retired from the network, or move too far away for line-of-sight optical connections, and/or as balloons are added to the network, or enter a region where line-of-sight optical connections are possible. As noted above, formation of a full duplex optical communication link between two arbitrary balloons requires that the two terminals be equipped with complementary terminals (e.g., one with a mode A terminal and another with a mode B terminal). To facilitate formation of such optical links between arbitrary pairs of balloons, the optical communication terminals can be configured to change between the two complementary modes of full duplex communication (e.g., from mode A to mode B and vice versa).

Figure 4C:
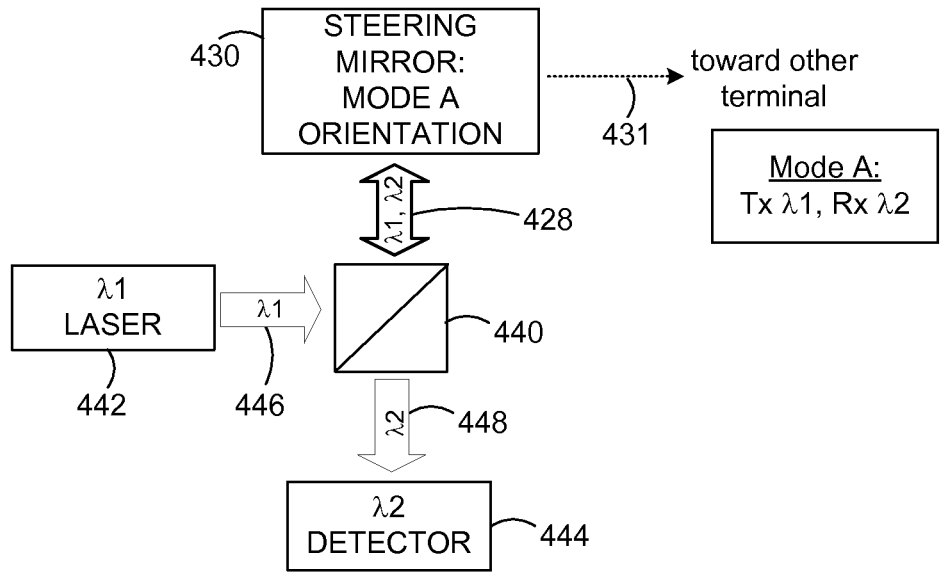
FIG. 4C is a simplified block diagram of an optical communication terminal aligned for operation in a first mode of full duplex communication.
Figure 4D:
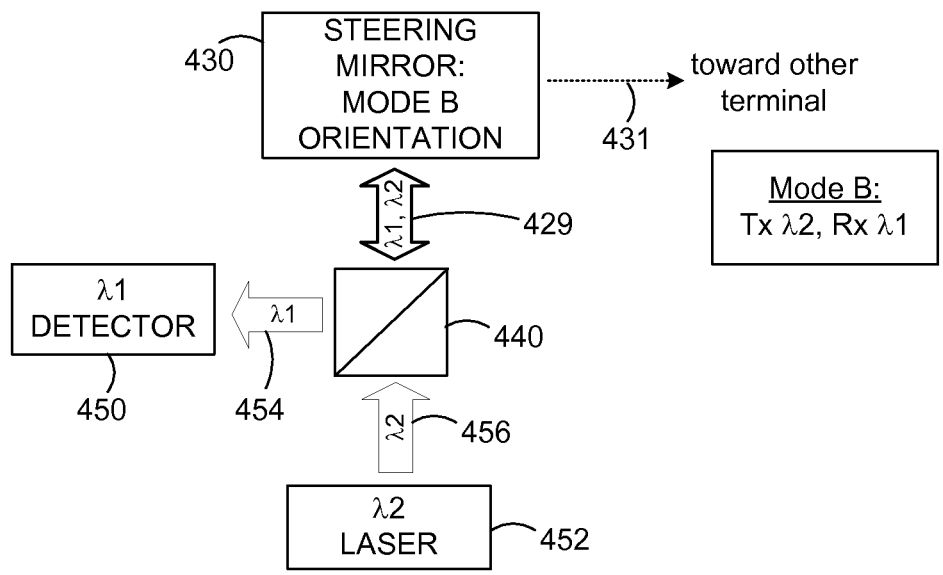
FIG. 4D is a simplified block diagram of an optical communication terminal aligned for operation in a second mode of full duplex communication.

As shown in FIGS. 4C and 4D, the optical terminal 420 can be configured to change between modes adjusting the orientation of the steering mirror 430. The optical terminal 420 can include spatially separated emitters and detectors arranged to be selectively aligned with a given lightpath by the steering mirror, depending on the mode of operation. For example, the optical terminal may include a first emitter/detector pair that transmits/receives light to/from a common direction while the steering mirror has a first orientation. The optical terminal may also include a second emitter/detector pair that transmits/receives light to/from the same direction while the steering mirror has a second orientation. The first emitter/detector pair can transmit at $\lambda 1$ and receive at $\lambda 2$, so the optical terminal 420 can be configured to operate in mode A while the steering mirror 430 has the first orientation; and the second emitter/detector pair can transmit at $\lambda 2$ and receive at $\lambda 1$, so the optical terminal 420 can be configured to operate in mode B while the steering mirror 430 has the second orientation. Thus, the terminal 420 can include a $\lambda 1$ laser light source 442 and a $\lambda 2$ detector 444, which are used when operating in mode A, and also a $\lambda 2$ laser light source 450 and a $\lambda 1$ detector 452, which are used when operating in mode B.

FIG. 4C is a simplified block diagram of the optical communication terminal 420 aligned for operation in a first mode of full duplex communication (e.g., mode A). In mode A, the optical communication terminal 420 transmits at $\lambda 1$ and receives at $\lambda 2$, and the steering mirror 430 directs the data modulated light 428 to/from fixed optical components in direction 431 (toward another terminal). The optical components include a dichroic beam splitter 440, which substantially reflects $\lambda 1$ light and substantially transmits $\lambda 2$ light. The dichroic beam splitter 440 thereby provides wavelength-dependent optical pathways through the optical terminal 420 and thereby separate transmitted $\lambda 1$ light 446 from received $\lambda 2$ light 448. The dichroic beam splitter 440 thereby allows the $\lambda 1$ light 446 to be emitted from a spatially distinct location, within the optical terminal, than a location where the received $\lambda 2$ light 448 is detected, yet the $\lambda 1$ light and $\lambda 2$ light (428) propagate along a common optical path (although in opposite directions) between the dichroic beam splitter 440 and the steering mirror 430. In FIG. 4C, the steering mirror 430 has a first orientation, which directs data modulated laser light 446 from the $\lambda 1$ laser light source 442 toward the direction 431. Simultaneously, the steering mirror 430 directs incoming $\lambda 2$ light 448 from direction 431 toward $\lambda 2$ detector 444. While in the first orientation, the optical terminal 420 is configured to operate in mode A and conduct full duplex communication with a remote terminal located in direction 431.

FIG. 4D is a simplified block diagram of the optical communication terminal 420 aligned for operation in a second mode of full duplex communication. In mode B, the optical communication terminal 420 transmits at $\lambda 2$ and receives at $\lambda 1$, and the steering mirror 430 directs the data modulated light 429 to/from fixed optical components in direction 431 (toward the other terminal). In FIG. 4D, the steering mirror 430 has a second orientation, which directs data modulated laser light 456 from the $\lambda 2$ laser light 452 source toward the direction 431. Simultaneously, the steering mirror 430 directs incoming $\lambda 1$ light 454 from direction 431 toward $\lambda 1$ detector 450. While in the second orientation, the optical terminal 420 is configured to operate in mode B and conduct full duplex communication with a remote terminal located in direction 431.

To allow the steering mirror 420 to align the outgoing and incoming light with the mode-specific emitter/detector pairs, and then change modes solely by changing the alignment of the steering mirror 430, the optical pathways within the optical terminal are angularly offset from one another by a common amount. That is, within the terminal 430, the optical pathway traversed by outgoing $\lambda 1$ light between the $\lambda 1$ laser 442 and the steering mirror 430 (in mode A) is angularly separated from the optical pathway traversed by incoming $\lambda 1$ light between the $\lambda 1$ detector 450 and the steering mirror 430

(in mode B). The angular separation allows the outgoing/incoming light to be aimed alternately at the λ1 laser 442 or the λ1 detector 450 via manipulation of the steering mirror 430, depending on the mode of operation. Similarly, the optical pathway traversed by outgoing λ2 light between the λ2 laser 452 and the steering mirror 430 (in mode B) is angularly separated from the optical pathway traversed by incoming λ2 light between the λ2 detector 444 and the steering mirror 430 (in mode A). The angular separation between the two λ1 optical pathways can be the same as the angular separation between the two λ2 optical pathways.

By arranging the laser light sources 442, 452, the detectors 444, 450, and the dichroic beam splitter 440 to achieve a common angular separation as described, the terminal 420 can change between modes of operation solely by moving the steering mirror 430, and activating the corresponding light source and detector. As a result, the terminal 420 can be dynamically reconfigured to switch modes of full duplex communication solely by moving the steering mirror, and the remaining optical components in the terminal 420 can remain fixed, and alignment can be maintained. The arrangement thereby allows the terminal 420 to switch modes of operation without tuning or adjusting any components in the optical terminal other than the steering mirror 420.

In practice, the "first orientation" and "second orientation" of the steering mirror 430 may be substantially fixed angular orientations for a given direction 431. But to communicate with a remote terminal in an arbitrary direction (within the field of view of terminal 420), the terminal 420 may be configured to orient the mirror through a range of angles so as to direct outgoing and incoming light accordingly. Generally, for a given direction of optical free space propagation (i.e., a given lightpath) there are two different possible orientations of the steering mirror 430: one which aligns the transmitted/received light with a λ1 emitter and λ2 detector (for mode A communication), and another which aligns the transmitted/received light a λ2 emitter and λ1 detector (for mode B communication). The optical terminal can therefore include a control system that can select and maintain an orientation of the steering mirror 430 based on the mode of full duplex communication and the direction of the lightpath.

In some cases, modes of operation for the individual optical communication terminals in the network 400 can be assigned by a central control system (e.g., the control system 200 described in connection with FIG. 2). In other cases, modes of operation can be established on an ad hoc basis based on initial communications amongst the individual balloons in the network 400 to form the links that make up the mesh network.

4. Example Full Duplex Optical Communication Terminals

Figure 5:
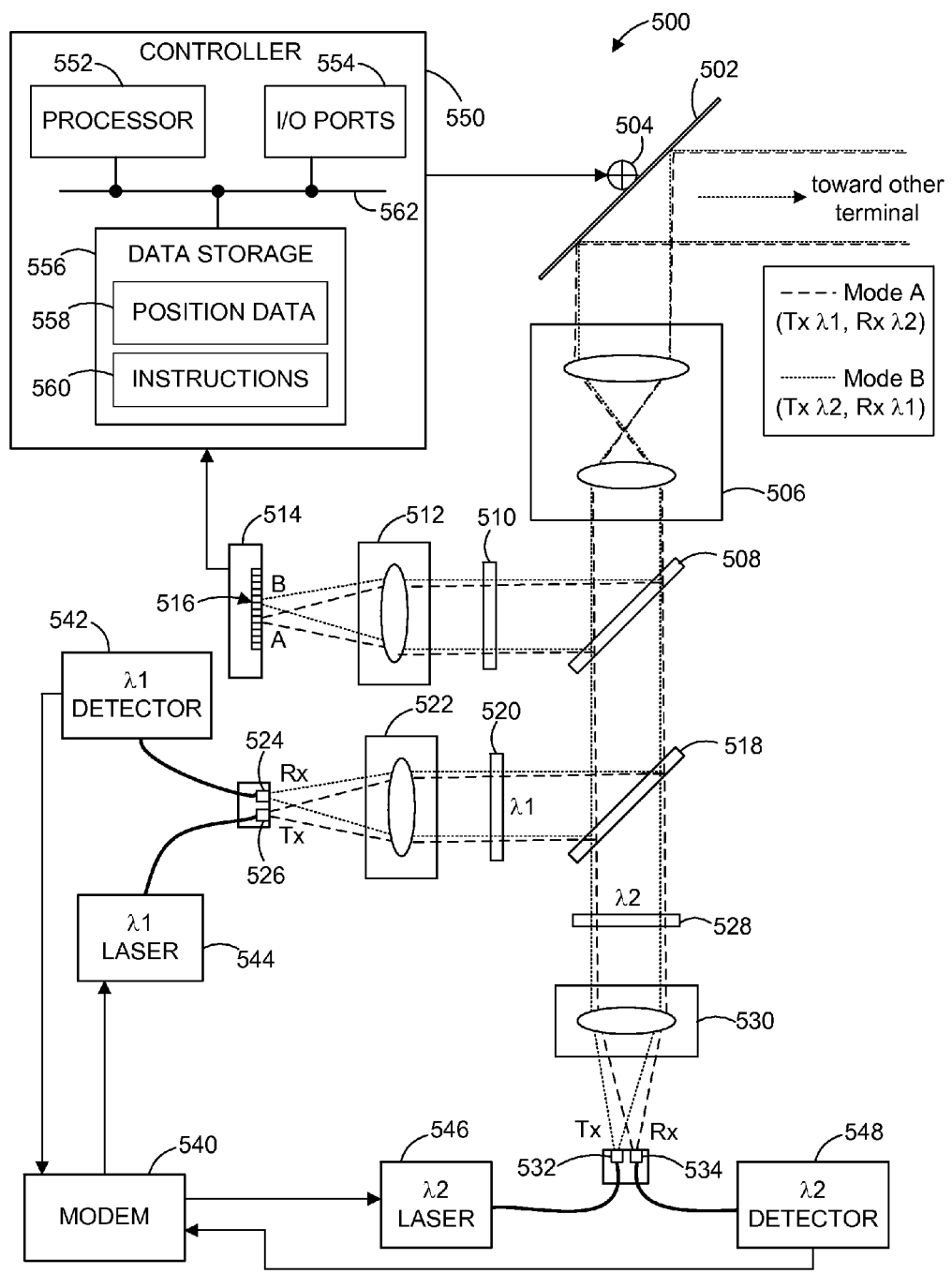
FIG. 5 is a diagram of an example optical communication terminal arranged to operate alternately in two different modes.

FIG. 5 is a diagram of an example optical communication terminal 500 arranged to operate alternately in two different modes. The optical communication terminal 500 may be similar in some respects to the optical communication terminal 420 described above, and may be configured to be mounted to a payload of a high altitude platform, such as a balloon in the networks described above. The terminal 500 includes a steering mirror 502, a dichroic beam splitter 518 that reflects λ1 and transmits λ2, and thereby divides the light based on wavelength. The diagram in FIG. 5 illustrates two distinct optical paths through the optical terminal 500, which correspond to alternate operation in mode A and mode B. Dashed lines show the optical paths of transmitted λ1 light and also received λ2 light, which are traversed during operation in mode A. Dotted lines show the optical paths of transmitted λ2 light and also received λ1 light, which are traversed during operation in mode B. The distinct optical paths correspond to different orientations of the beam steering mirror 502, and are angularly separated by a small enough amount that they share optical components, such as focusing/collimating optics, filters, beam splitters, and the like. However, the distinct paths are also angularly separated by a large enough amount that they direct light to/from spatially separated locations within the optical terminal 500 to thereby enable the distinct modes of operation.

4a) Wavelength Differentiated Optical Paths

The features of the optical terminal 500 are described generally with reference to incoming light, although it is understood that light may propagate in the reverse (outgoing) direction as well. Collimated beams of light from another remote terminal propagate along a free space optical pathway to the terminal 500 and are reflected by the steering mirror 500, which directs the incoming light to relay optics 506. The relay optics can include one or more lenses, reflectors, apertures, etc. that relay the collimated beams of light between the steering mirror 502 and the remaining optics components within the terminal 500. The relay optics 506 may scale the beam to another size, if desired, and output a collimated beam toward a beam splitter 508. The beam splitter 508 diverts some of the incoming light toward an orientation feedback sensor 514 for use in controlling the alignment of the steering mirror 502, which is described further below. The beam splitter 508 may, for example, divert about 2% to 5% of the incoming light, with the remaining light transmitted to a dichroic beam splitter 518.

The dichroic beam splitter 518 can be an optical element with a wavelength-dependent transmission/reflection profile. In some cases, the dichroic beam splitter 518 may be implemented by a wavelength-dependent coating applied to another optical element, such as a lens. The dichroic beam splitter 518 may substantially reflect light having wavelength λ1 while substantially transmitting light having wavelength λ2. The dichroic beam splitter 518 therefore results in the incoming light traversing different optical paths, depending on wavelength. Light having wavelength λ1 may enter a branch that is substantially transverse to the optical axis of the relay optics 506, and light having wavelength λ2 may continue to a branch parallel to the optical axis of the relay optics.

Along the λ1 branch, the light passes through a filter 520, which helps block light having other wavelengths. The filter 520 may transmit a range of wavelength that includes λ1. The filter 520 may also substantially block λ2 light, which helps mitigate cross talk from light on the other branch of the optical terminal 500. The filtered λ1 light is then focused by focusing optics 522 to illuminate a detection location 524. The focusing optics 522 can include a lens with a suitable focal length to focus the collimated beam of λ1 light onto the detection location 524 while the terminal operates in mode B, as shown by the dotted lines. The detection location 524 can be optically coupled to a λ1 detector 542 (e.g., an avalanche photodiode or the like) via a fiber connection, for example. In some examples, the detection location 524 may be implemented by an aperture in a ferrule that terminates a fiber optic cable, which is connected to the λ1 detector 542.

In the reverse direction of light propagation, light from a λ1 laser 544 can be fiber coupled to an emission location 526. As shown by the dashed lines, in mode A, λ1 light emitted from the emission location 526 propagates toward the focusing optics 522, which collimates the emitted light and directs the light back through the filter 520 to the dichroic beam splitter 518, where the λ1 light is reflected toward the steering mirror 502 (via the relay optics 506) for transmission over the free space optical path. The emission location 526 may be implemented by an aperture in a ferrule that terminals a fiber optic cable, which is connected to the λ1 laser 544. In some cases, the detection location 524 and emission location 526 may be implemented by a dual core fiber ferrule, and the respective optical signals can then be conveyed via respective cores in a fiber to the λ1 detector 542 and λ1 laser 544.

Referring again to incoming light, along the λ2 branch (from λ2 light that is transmitted through the dichroic beam splitter 518), the light passes through a filter 528, which helps block light having other wavelengths. The filter 528 may transmit a range of wavelength that includes λ2. The filter 528 may also substantially block λ1 light, which helps mitigate cross talk from light on the other branch of the optical terminal 500. The filtered λ2 light is then focused by focusing optics 530 to illuminate a detection location 534. The focusing optics 530 can include a lens with a suitable focal length to focus the collimated beam of λ2 light onto the detection location 530 while the terminal 500 operates in mode A, as shown by the dashed lines. The detection location 530 can be optically coupled to a λ2 detector 548 (e.g., an avalanche photodiode or the like) via a fiber connection, for example. In some examples, the detection location 534 may be implemented by an aperture in a ferrule that terminates a fiber optic cable, which is connected to the λ2 detector 548.

In the reverse direction of light propagation, light from a λ2 laser 546 can be fiber coupled to an emission location 532. As shown by the dotted lines, in mode B, λ2 light emitted from the emission location 532 propagates toward the focusing optics 530, which collimates the emitted light and directs the light back through the filter 528 to the dichroic beam splitter 518, where the λ2 light is transmitted toward the steering mirror 502 (via the relay optics 506) for transmission over the free space optical path. The emission location 532 may be implemented by an aperture in a ferrule that terminals a fiber optic cable, which is connected to the λ2 laser 546. In some cases, the detection location 534 and emission location 532 may be implemented by a dual core fiber ferrule, and the respective optical signals can then be conveyed via respective cores in a fiber to the λ2 detector 548 and λ2 laser 546.

4b) Orientation Feedback

As noted above, the optical terminal 500 also includes an orientation feedback sensor 514, which detects a portion of incoming light that is diverted by the beam splitter 508 after being reflected by the steering mirror 502. The diverted light (which may be about 2% to 5% of the light incident on beam splitter 508) passes through filter 510 (which may pass both λ1 and λ2 light and block light at other wavelengths), and is then focused by focusing optics 512 on the orientation feedback sensor 514. The orientation feedback sensor 514 can include a photo-sensitive array 516, such as an array of photodiodes that generate electrical signals based on the pattern of light illuminating the array. In mode A, λ2 light received from a remote terminal illuminates the photo-sensitive array 516, as indicated by the dashed lines. In mode B, λ1 light received from the remote terminal illuminates the photo-sensitive array 516, as indicated by the dotted lines.

The position on the photo-sensitive array 516 that is illuminated depends on the angle of arrival of the incident light. Thus, the illumination pattern detected using the photo-sensitive array 516 can be used to determine the orientation of the steering mirror 502. For example, a centroid position of the light focused on the photo-sensitive array 516 may be determined, and the orientation of the steering mirror 502 may be determined based on the centroid position. Such a determination may be made, for example, using a controller 550 that receives signals from the orientation feedback sensor 514 indicative of the measured illumination pattern. Based on the signals from the orientation feedback sensor 514, the controller 550 can generate commands to the mirror positioning system 504 to thereby adjust the orientation of the steering mirror 502 and thereby align the incident light in a desired manner. Moreover, because the optical components in the terminal 500 are fixed with respect to one another (e.g., by being mounted to a common frame structure), different centroid positions of the light diverted to the photo-sensitive array 516 correspond to different alignments of the light that continues to the λ1 or λ2 branches. In particular, there are two particular target locations on the photo-sensitive array 516 where incident light corresponds to an alignment in which the terminal 500 operates in mode A or in mode B.

For example, when the diverted λ1 light is focused on the location marked B, where the dotted lines converge on the photo-sensitive array 516, the λ1 light that is not diverted by the beam splitter 508 is aligned to illuminate the detection location 524, and the λ2 light emitted from the emission location 532 is simultaneously directed (via the steering mirror 502) so as to propagate in the same direction from which the λ1 light is received (i.e., toward the remote terminal). Thus, the target location B can be a location on the photo-sensitive array 516 associated with operation of the terminal 500 in mode B. Similarly, when the diverted λ2 light is focused on the location marked A, where the dashed lines converge on the photo-sensitive array 516, the λ2 light that is not diverted by the beam splitter 508 is aligned to illuminate the detection location 534, and the λ1 light emitted from the emission location 526 is simultaneously directed (via the steering mirror 502) so as to propagate in the same direction from which the λ2 light is received (i.e., toward the remote terminal). Thus, the target location A can be a location on the photo-sensitive array 516 associated with operation of the terminal 500 in mode A. The target locations A and B may be substantially fixed locations on the photo-sensitive array 516 and may be determined based on a calibration routine. In some examples, the two target locations A and B can be positions on a single photo-sensitive array (e.g., the photo-sensitive array 516). Although in some examples, the orientation feedback sensor 514 can include two distinct photo-sensitive arrays located at each of the target locations A and B.

4c) Controller

The controller 550 may be configured to use measurements of light illuminating the photo-sensitive array 516 to adjust the orientation of the steering mirror 502. The controller 550 may cause the steering mirror 502 to adjust such that the centroid position of light illuminating the photo-sensitive array moves closer to one of the two target locations, depending on the mode of operation. For example, the controller 550 may obtain a measurement of an illumination pattern on the photo-sensitive array 516, determine an adjustment to the orientation of the steering mirror 502 that would shift the illumination pattern closer to a desired target location, and then instruct the positioning system 504 accordingly. Moreover, the controller 550 may operate on an ongoing basis to adjust the steering mirror 502 and thereby track subtle changes in the direction of the incident light due to relative movement of the remote terminal, for example.

In one example, the controller 550 may include a processing unit 552, data storage 556, and one or more input/output ports 554, which may be communicatively linked together by a system bus, or one or more other connection mechanisms 562. The data storage 556 may include a non-transitory computer readable medium and includes position data 558 and operating instructions 560. The instructions 560 may include, for example, program logic that, when executed by the processing unit 552, cause the controller 550 to carry out the functions described herein. Thus, the instructions 560 may cause the controller 550 to determine an adjustment to the orientation of the steering mirror 502 based on data from the orientation feedback sensor 514, and to generate corresponding instructions for the mirror positioning system 504. The position data 558 may include stored indications of particular target locations on the photo-sensitive array that correspond to the two different modes of full duplex communication. The position data 558 may therefore be established during a calibration routine, for example. The input/output ports 554 function to receive data from the orientation feedback system 514 and also to provide command instructions to the mirror positioning system 504.

In addition, the controller 550 may, perhaps in coordination with other entities, function to receive mode selection commands from a central controller (or other entity) and to cause the terminal 500 to configure itself accordingly (e.g., by aligning with the corresponding target location).

Further, the controller 550 may, perhaps in coordination with other entities, function to operate the terminal to send and receive data. The controller 550 and/or modem 540 may, while in mode A, receive output data for transmission over the free space optical link, and cause the λ1 laser 544 to emit light that is modulated in accordance with the output data. Simultaneously, the controller 550 and/or modem 540 may extract input data based on the modulation of light detected with the λ2 detector 548. Similarly, the controller 550 and/or modem 540 may, while in mode B, receive output data for transmission over the free space optical link, and cause the λ2 laser 546 to emit light that is modulated in accordance with the output data. Simultaneously, the controller 550 and/or modem 540 may extract input data based on the modulation of light detected with the λ1 detector 542.

While the terminal 500 is described generally in terms of optical signals at wavelengths λ1 and λ2, it is understood that the two wavelengths may have a range of different values. In some cases, wavelengths that are not readily absorbed within the atmosphere may be selected. For example, λ1 may be about 1540 nanometers, and λ2 may be about 1560 nanometers. Of course, in another example λ1 may be 1560 and λ2 may be 1540, such that the greater of the two wavelengths is diverted transverse, along the λ1 branch of the terminal 500. However, many other wavelengths in the ultraviolet, visible, and near infrared spectrum may also be selected. In addition, for given values of λ1 and λ2, the various filters 510, 520, 528, lasers 542, 546, detectors 544, 548, and the dichroic beam splitter 518 may be selected to achieve the wavelength specific behaviors described herein (including selection of lasing media, photodiodes, coatings, etc.). Moreover, the photo-sensitive array 516 of the orientation feedback sensor 514 may be implemented with a technology suitable for detection of the received wavelength. As one example, a sensor array formed from photodiodes including Indium Gallium Arsenide (InGaAs) elements may be suitable for detection of light from an Erbium doped solid state laser diode (e.g., in a band around 1550 nanometers). Many other examples are possible, including wavelengths in a band around 1000 nanometers implemented with laser diodes having lasing media that include yttrium aluminum garnet (YAG) doped with a variety of materials.

4d) Alternative Orientation Feedback Sensor

Figure 6:
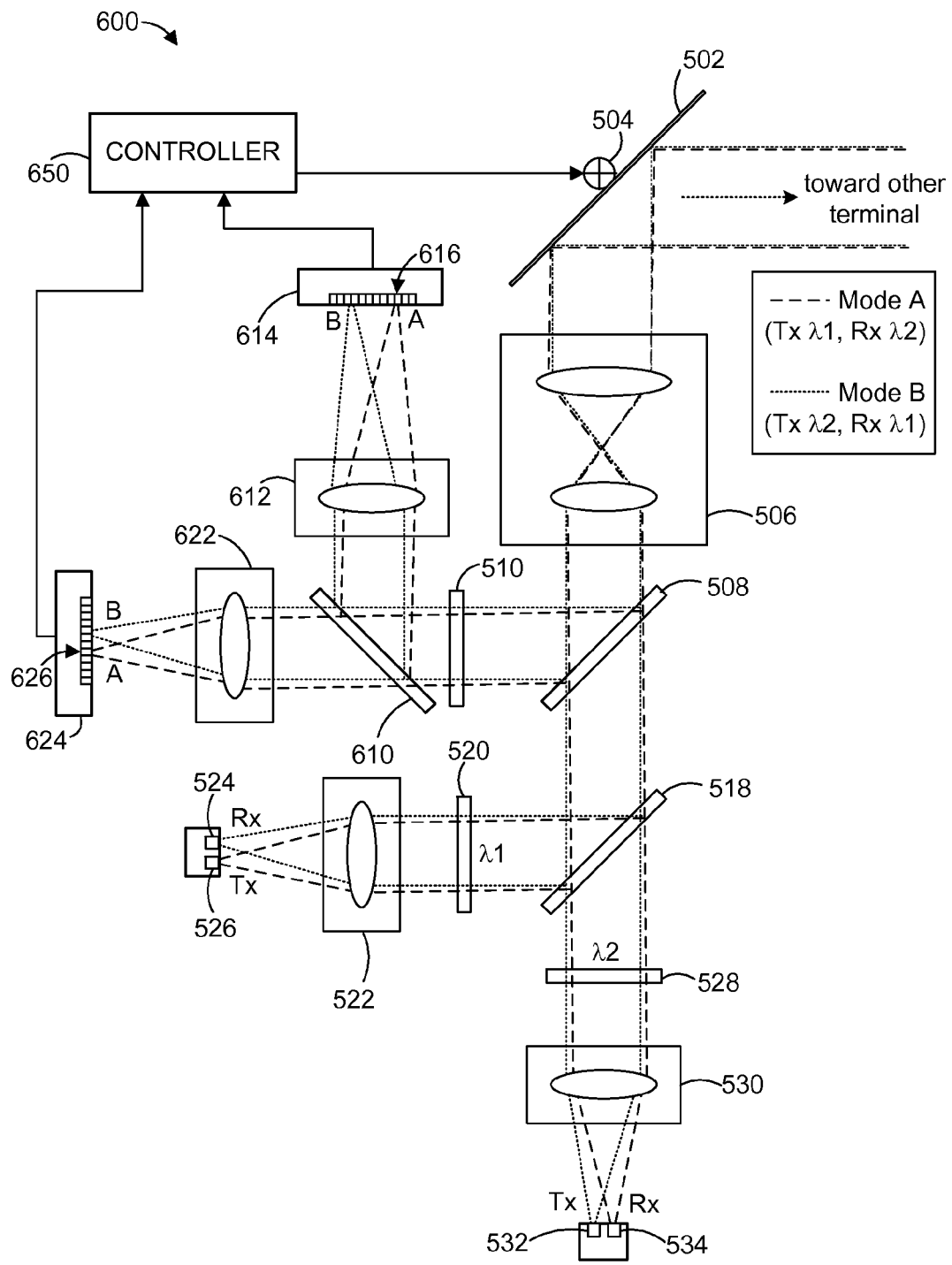
FIG. 6 is a diagram of another example optical communication terminal.

FIG. 6 is a diagram of another example optical communication terminal 600. The terminal 600 is similar in some respects to the terminal 500 described above in connection with FIG. 5, and may be mounted to a payload of a high altitude platform, such as a balloon, in a network to provide free space optical communication links between different balloons. However, the terminal 600 includes an alternative arrangement to the orientation feedback sensor described above. The terminal 600 includes a coarse position sensor 624 and a fine position sensor 614, which each receive a fraction of the light that is diverted by the beam splitter 508 and passes through the filter 510. In the example configuration illustrated in FIG. 6, a second beam splitter 610 divides the beam of incoming light from the beam splitter 508 and reflects some toward the fine position sensor 614, and transmits some toward the coarse position sensor 624. The beam splitter 610 may divide the light such that about half goes each direction, although other possibilities may be employed (e.g., 40/60, 30/70, etc.). In some examples, the terminal 600 may be implemented with the fine position sensor 614 and the coarse position sensor 624 situated in a variety of different positions along the optical pathway of the terminal 600 such that each sensor receives at least some light reflected by the steering mirror 502. As such, the fine position sensor 614 and coarse position sensor 624 can be used to provide feedback on the orientation of the steering mirror 502, and thus the mode of operation of the terminal 600.

Focusing optics 622 focus the light on a photo-sensitive array 626 of the coarse position sensor 624 and focusing optics 612 focus the light on a photo-sensitive array 616 of the fine position sensor 614. Each of the photo-sensitive arrays 616, 626 have target locations associated with alignment for operation in mode A or in mode B. The coarse position sensor 624 is used to provide coarse orientation feedback to the steering mirror 502 and the fine position sensor 614 is used to provide fine tuning of the orientation. The angles of incident light that can be detected with the coarse position sensor 624 may therefore span a greater range, but with coarser granularity, than the angles of incident light that can be detected by the fine position sensor 614. Generally, the angular span that can be detected, and the extent to which particular angles can be resolved, with either of the position sensors 614, 624 depends both on the respective focusing optics 622, 612 and the size and resolution of the respective photo-sensitive arrays 616, 626. For example, both photo-sensitive arrays 616, 626 may be substantially similar, but the focusing optic 622 may have a relatively short focal length, which allows the photo-sensitive array 614 to be positioned closer to the optic 622, and a greater angular range of incident light to illuminate the photo-sensitive array 626. By contrast, the focusing optic 612 may have a relatively long focal length, which allows the photo-sensitive array 616 to be positioned further away, and a lesser angular range of incident light to illuminate the photo-sensitive array 616, but with greater resolution between angles.

In some examples, the coarse position sensor 624 may be used primarily to align the steering mirror 502 with sufficient accuracy to get the incident light to illuminate the photo-sensitive array 616 of the fine position sensor 614. In some examples, moreover, the terminal 600 may also include an additional fine-steering mirror in the optical pathway of the terminal that receives light reflected by a primary coarse-steering mirror (e.g., the steering mirror 502). In such an arrangement, the coarse-steering mirror can receive orientation feedback from a coarse position sensor. The coarse position sensor can then be used to orient the coarse-steering mirror such an incident light is reflected by the fine-steering mirror. The fine-steering mirror can then receive orientation feedback from a fine position sensor, which is situated to receive light reflected by the fine-steering mirror.

In another example, the two photo-sensitive arrays 616, 626 may have different configurations. For instance, the fine position sensor array 616 may be a quad cell detector that detects a position of an incident beam relative to an intersection of four pixel detectors or another position-sensing detector. The coarse position sensor array 626 may be a photo-sensitive array with a larger field of view, such as a two-dimensional array of pixel detectors similar to those employed in imaging applications. Moreover, the fine position sensor array 616 (e.g., quad cell detector) may be operated at a relatively higher read-out rate than the coarse position sensor array 626, and thereby allow for more frequent feedback to adjust the orientation of the steering mirror 502.

Feedback from both position sensors 624, 614 can be provided to the controller 650 which determines an adjustment to the orientation of the steering mirror 502 so as to align the position of the measured light with a mode-specific target location (e.g., the locations labelled with A and B in FIG. 6), and instructs the mirror positions system 504 accordingly. In some examples, when forming an initial link, the controller 600 may initially check whether a centroid position of incoming light can be detected on the fine position sensor 614. If not, such as if the initial alignment is offset by too much to reach the fine position sensor 614, the controller 600 may begin adjusting the orientation of the steering mirror 502 based on information from the coarse position sensor 624 and then transition to using the fine position sensor 614 once the detected centroid position is near the coarse position target location. In some cases, the coarse position sensor 624 and/or fine position sensor 614 may include multiple distinct photo-sensitive detectors, with one detector situated at the respective mode-specific target locations, similar to the orientation feedback sensor 514 described above. For example, the fine position sensor array 616 may include two quad cell detectors, one at target location A, and one at target location B. Further still, the controller 650 may be configured to use a combination of measurements from the two position sensors 614, 624 simultaneously.

4e) Alignment Laser

Figure 7:
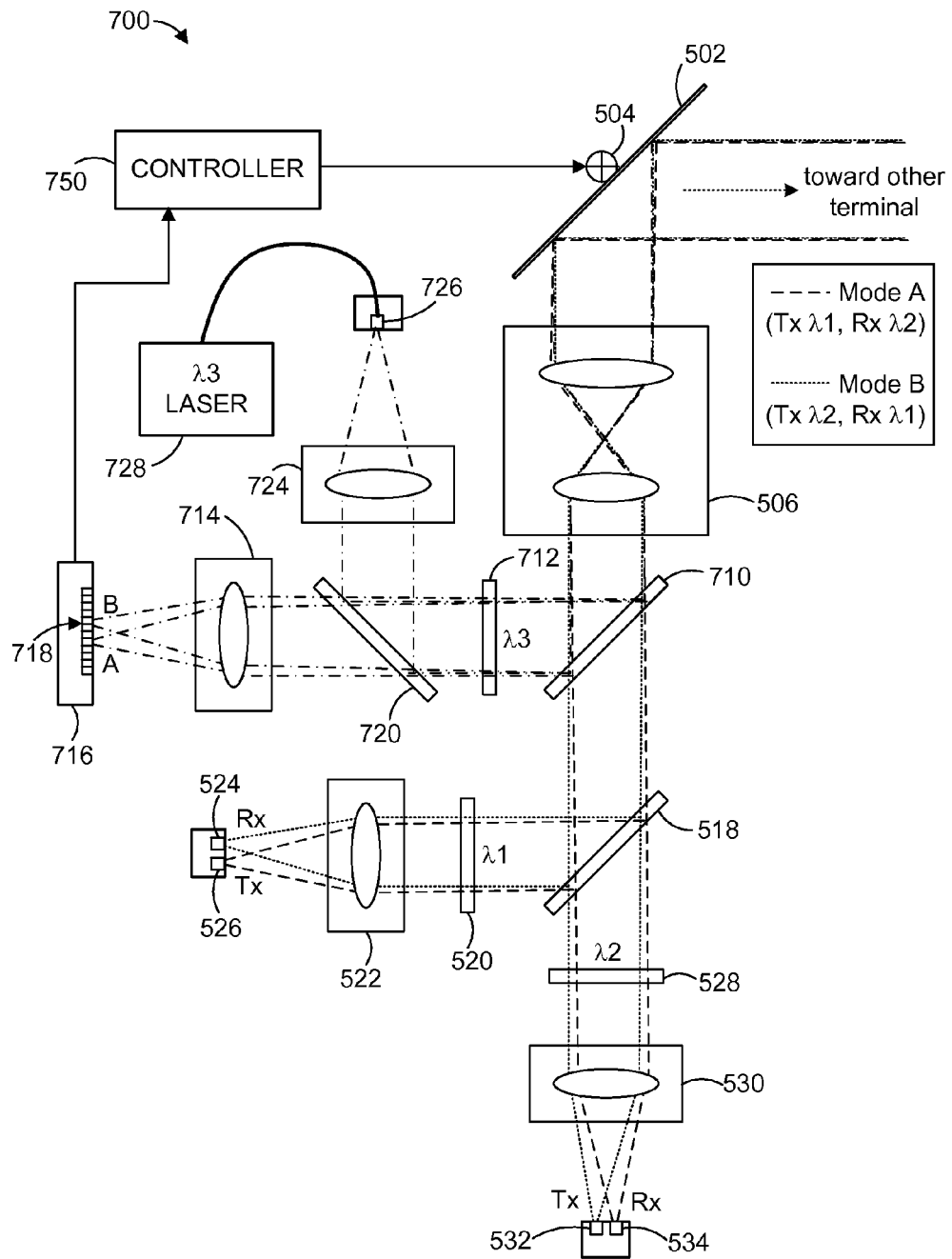
FIG. 7 is a diagram of another example optical communication terminal.

FIG. 7 is a diagram of another example optical communication terminal 700. The terminal 700 is similar in some respects to the terminals 500 described above in connection with FIG. 5, and may be mounted to a payload of a high altitude platform, such as a balloon, in a network to provide free space optical communication links between different balloons. However, the terminal 700 includes an alignment laser light source 728 that emits light at a third wavelength $\lambda 3$ that is different from both $\lambda 1$ and $\lambda 2$. Another dichroic element 710 substantially transmits $\lambda 1$ light and $\lambda 2$ light, and substantially reflects $\lambda 3$ light. The dichroic element 710 is positioned to receive incoming light from the relay optics 506, and thereby divert incoming $\lambda 3$ light along a $\lambda 3$ optical path distinct from the $\lambda 1$ and $\lambda 2$ branches. The diverted $\lambda 3$ light passes through a filter 712 that selectively transmits $\lambda 3$ light, and then a beam splitter 720 allows some of the incoming $\lambda 3$ light to pass toward an orientation feedback sensor 716. The beam splitter 720 directs light from the $\lambda 3$ laser light source 728 for transmission to the remote terminal, via the dichroic element 710, relay optics 506, and steering mirror 502.

The alignment laser 728 is optically coupled to an emission location 726 via a fiber. An optic 724 collimates $\lambda 3$ light from the emission location 726 and directs the light toward the beam splitter 720. The beam splitter 720 can be an optic element that partially reflects light at $\lambda 3$ and partially transmits light at $\lambda 3$. As noted above, the beam splitter 720 diverts at least some of the $\lambda 3$ light to be transmitted from the terminal 700, and also allows some incoming $\lambda 3$ light (from the remote terminal) to pass through to the orientation feedback sensor 716.

After entering the $\lambda 3$ branch, the incoming $\lambda 3$ light passes through a filter 712 and is focused on a photo-sensitive array 718 of the orientation feedback sensor 716 by focusing optics 714. The orientation feedback sensor 716 can be similar to the orientation feedback sensor 514 described in connection with FIG. 5, except that the photo-sensitive array 718 is configured to detect light at $\lambda 3$ rather than $\lambda 1$ and $\lambda 2$. The orientation feedback sensor 716 provides signals to the controller 750 indicative of measured $\lambda 3$ light that illuminates the photo-sensitive array 718. And the controller 750 can operate the mirror positioning system 504 to adjust the orientation of the steering mirror 502 to cause the centroid position of the illuminating light to become aligned with a mode-specific target location (e.g., the locations labelled A and B in FIG. 7).

The dichroic element 710 is configured to both divert at least some incoming $\lambda 3$ light toward the orientation feedback sensor 716 yet still transmit at least some outgoing $\lambda 3$ light from the $\lambda 3$ laser, and also to substantially transmit all light at $\lambda 1$ and $\lambda 2$. The dichroic element 710 may therefore be implemented by an optic partially coated with a layer that selectively reflects $\lambda 3$, which divides the $\lambda 3$ light between a reflected portion and a transmitted portion. Moreover, while the two dichroic elements 710, 720 are illustrated as items which reflect $\lambda 3$ (at least partially) and transmit $\lambda 1$ and $\lambda 2$, some embodiments may include dichroic elements that transmit $\lambda 3$ and reflect $\lambda 1$ and $\lambda 2$, in which case the $\lambda 1$ and $\lambda 2$ optical paths may be directed transverse to the optical axis of the relay optics 506. Similarly, either the alignment laser emission location 726 or the orientation feedback sensor 716 may be located parallel to the optical axis of the relay optics. Generally, however dichroic elements 710, 720 are arranged to cause $\lambda 3$ light to traverse a different optical path through the terminal 700, and yet still align with the transmitted/received light at $\lambda 1$ and $\lambda 2$ reflected by the steering mirror 502.

Using a separate alignment laser having a wavelength (e.g., $\lambda 3$) that differs from the communication wavelengths (e.g., $\lambda 1$ and $\lambda 2$) may allow some benefits. The power of the $\lambda 3$ light illuminating the orientation feedback sensor 716 does not come at the expense of power in the communication signals, as in the terminals 500 and 600. Separating the alignment sensor at a non-communication wavelength allows the signal to noise of the $\lambda 3$ light provided to the orientation feedback sensor 716 to be substantially independent of the signal to noise of the communication signals.

In addition, the photo-sensitive array 718 can be implemented to provide photodiodes that are sensitive to light at $\lambda 3$, independent of the communication wavelengths. For example, even with communication wavelengths in a band near 1550 nanometers, the alignment laser may be at 904 nanometers, and the photo-sensitive array 718 may be implemented using a complementary metal oxide semiconductor (CMOS) array of photodiodes, rather than InGaAs.

Generally, the various features of the optical communication terminals described herein may be combined in a variety of different ways. For instance, an optical communication terminal may be implemented to include both the alternative orientation feedback sensor arrangement of the terminal 600 described in connection with FIG. 6 in combination with a separate alignment laser described in connection with FIG. 7.

In addition, while not specifically illustrated in the diagrams of FIGS. 5-7, each of the optical terminals 500, 600, 700 also includes a frame, housing, or other structural feature that the various optical components are mounted to. The frame structure can maintain the relative spacing, orientation, and/or positions of each the optical components (e.g., the lenses, dichroic elements, reflectors, the emission locations, the detection locations, etc.) such that the wavelength-specific paths of mode A and mode B remain in alignment with respect to one another.

5. Example Operation

Figure 8:
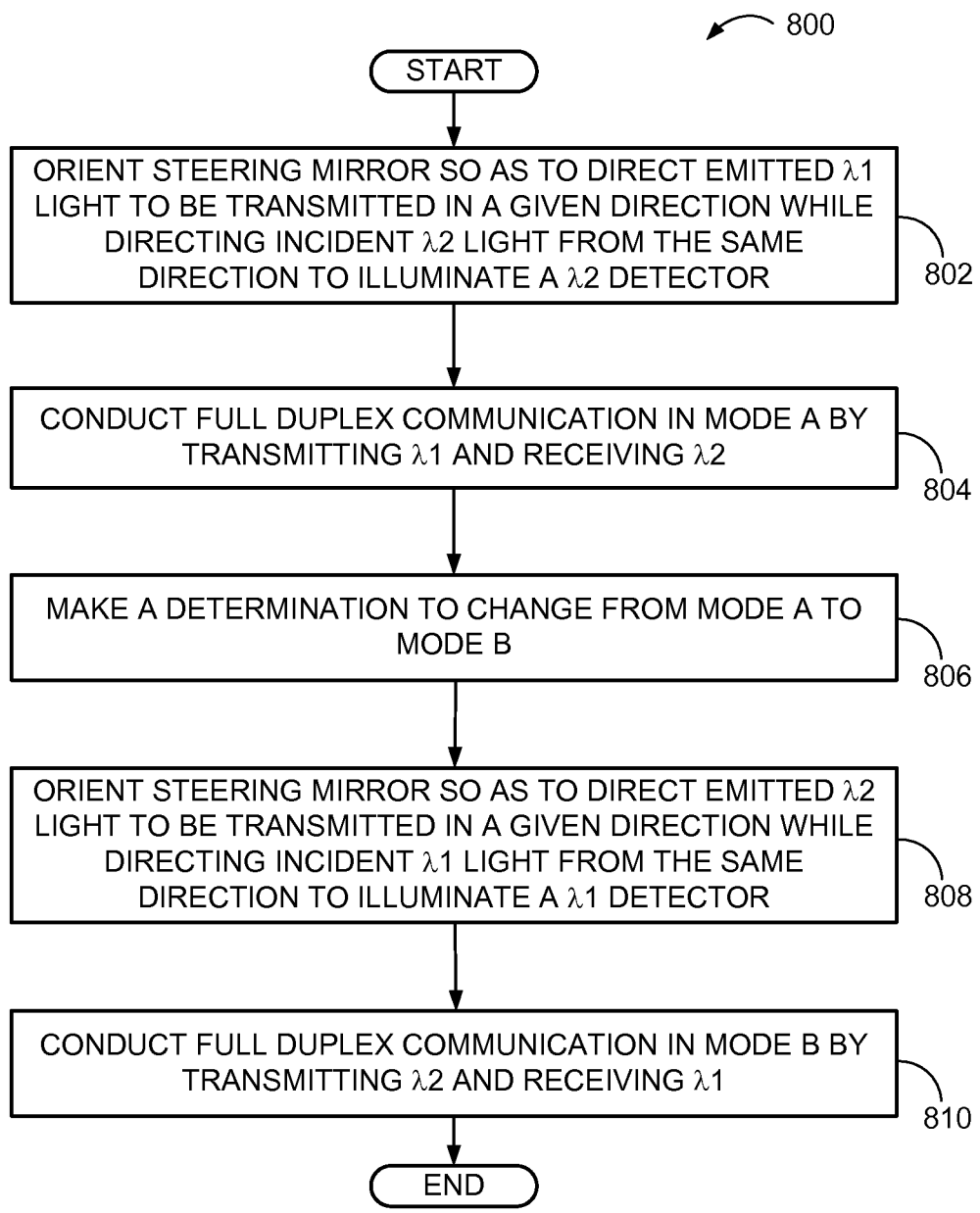
FIG. 8 is a flowchart of an example process for operating an optical communication terminal.

FIG. 8 is a flowchart of an example process 800 for operating an optical communication terminal according to an example embodiment. The process 800 illustrated in FIG. 8 may be implemented by any of the optical communication terminals described herein alone or in combination with hardware and/or software implemented functional modules, such as controllers situated aboard a balloon or at a ground station. At block 802, the optical communication terminal is configured for operation in mode A by orienting its steering mirror so as to direct emitted $\lambda 1$ light in a given direction while also directing incident $\lambda 2$ light from the same direction to illuminate a $\lambda 2$ detector. For example, the optical communication terminal may include an orientation feedback sensor that is illuminated by a portion of the incident $\lambda 2$ light (or light at another wavelength used for alignment), and provides feedback to a positioning system to orient the mirror so as to align the light illuminating the orientation feedback sensor with a target location.

At block 804, the optical communication terminal can conduct full duplex communication in mode A by transmitting data modulated light at $\lambda 1$, and receiving data modulated light at $\lambda 2$. For example, a modem may be used to both encode output data into the transmitted $\lambda 1$ light by instructing the $\lambda 1$ laser to emit light with a particular modulation pattern that corresponds to the output data. The modem may also extract (decode) data from the received $\lambda 2$ light by detecting a modulation pattern of the received $\lambda 2$ light, and identifying input data that corresponds to the modulation pattern.

At block 806, the optical communication terminal makes a determination to change from mode A to mode B. The determination may be made on the basis of instructions from a central controller or another balloon that instruct the optical communication terminal to initiate an optical link with another balloon. Such instructions may include information for each balloon that specifies the approximate coordinates of the other balloon (e.g., GPS coordinates) and the mode of operation of each balloon. The determination may also be made based on other factors, including a determination made solely by the optical communication terminal. For example, the optical communication terminal may receive broadcast information regarding the relative position(s) of other nearby terminals (perhaps via a radio link), and may then attempt to establish an optical link with a particular one of the terminals by searching for an optical signal to use for alignment (and also transmitting an optical signal to use for alignment). The terminal can then align itself to conduct communication in one mode, and, if not successful after some period, may switch modes. The optical mesh network may thereby configure itself to establish complementary modes of operation to provide full duplex communication in an organic manner that is not entirely planned by a central controller.

At block 808 the optical communication terminal can orient its steering mirror so as to direct emitted $\lambda 2$ light in a given direction while also directing incident $\lambda 1$ light from the same direction to illuminate a $\lambda 1$ detector. Thus, the optical communication terminal can configure itself for operation in mode B in response to the determination made in block 806. For example, on the basis of instructions from a central network controller, the balloon's control system may orient one of its optical communication terminals to point toward a specified location and begin transmitting an optical signal for alignment purposes. The optical communication terminal can also begin searching for an incoming optical signal from the other balloon and, once the signal is detected, the terminal can use feedback to orient its steering mirror to align with a mode-specific target location such that the terminal is aligned to conduct full duplex communication in the specified mode of operation. Similarly, the other terminal orients using the optical signal received there and aligns itself for operation in the complementary mode.

At block 810, the optical communication terminal can conduct full duplex communication in mode B by transmitting data modulated light at $\lambda 2$, and receiving data modulated light at $\lambda 1$. For example, a modem may be used to both encode output data into the transmitted $\lambda 2$ light by instructing the $\lambda 2$ laser to emit light with a particular modulation pattern that corresponds to the output data. The modem may also extract (decode) data from the received $\lambda 1$ light by detecting a modulation pattern of the received $\lambda 1$ light, and identifying input data that corresponds to the modulation pattern.

Figure 9:
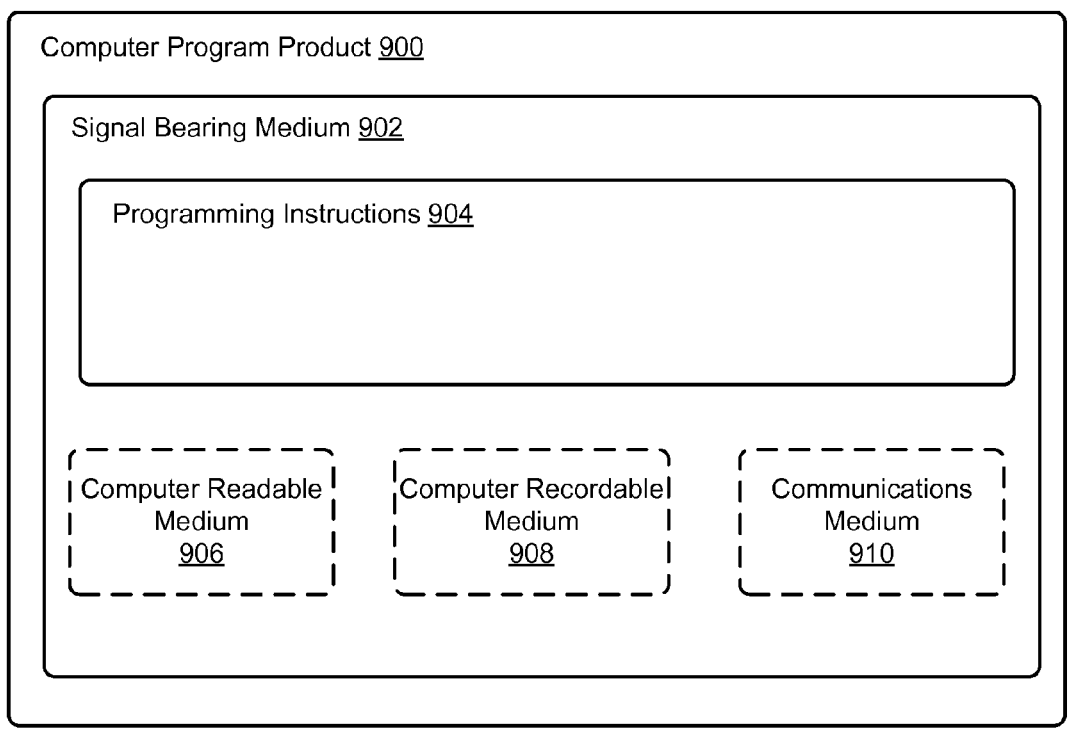
FIG. 9 illustrates a computer readable medium according to an example embodiment.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 708, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 312 of FIG. 3 may be configured to provide various operations, functions, or actions in response to the programming instructions 904 conveyed to the computer system 312 by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a device, such as the balloon 300 shown and described in reference to FIG. 3 or another high altitude platform. Alternatively, the computing device that executes some or all of the stored instructions could be another computing device, such as a server located in a ground station.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An optical communication terminal comprising:
a beam splitter configured to transmit light of a first wavelength and to reflect light of a second wavelength;
one or more light sources configured to emit light of the first wavelength from a first emission location and to emit light of the second wavelength from a second emission location;
one or more detectors configured to detect, at a first detection location, light of the first wavelength, and to detect, at a second detection location, light of the second wavelength;
a steering mirror; and
wherein the steering mirror and the beam splitter are arranged such that, while the steering mirror has a first orientation, (i) light of the first wavelength that is emitted from the first emission location is directed for transmission toward a remote terminal, and (ii) light of the second wavelength that is received from the remote terminal is directed toward the second detection location, and
wherein the steering mirror and the beam splitter are further arranged such that, while the steering mirror has a second orientation, (i) light of the second wavelength that is emitted from the second emission location is directed for transmission toward the remote terminal, and (ii) light of the first wavelength received from the remote terminal is directed toward the first detection location.

2. The optical communication terminal of claim 1, further comprising:
a controller configured to (i) make a determination to switch between modes of full duplex communication, and (ii) responsive to making the determination, cause the orientation of the steering mirror to change between the first orientation and the second orientation.

3. The optical communication terminal of claim 2, wherein the controller is further configured to:
while the steering mirror has the first orientation, operate the optical communication terminal in a first mode of full duplex communication by: (i) causing the one or more light sources to emit light of the first wavelength from the first emission location, modulated based on output data, and (ii) extracting input data based on light of the second wavelength, detected by the one or more detectors at the second detection location; and
while the steering mirror has the second approximate orientation, operate the optical communication terminal in a second mode of full duplex communication by: (i) causing the one or more light sources to emit light of the second wavelength from the second emission location, modulated based on output data, and (ii) extracting input data based on light of the first wavelength, detected by the one or more detectors at the first detection location.

4. The optical communication terminal of claim 1,
wherein the remote terminal is situated in a particular direction within a field of view of the optical communication terminal, and wherein the steering mirror is configured to have a range of orientations so as to direct light for transmission to, and to be received from, respective directions spanning the field of view, and
wherein, for a given one of the respective directions, the steering mirror is configured to have one of two approximate orientations, one of which directs light of the first wavelength emitted from the first emission location for transmission in the given one of the respective directions and also directs light of the second wavelength received from the given one of the respective directions toward the second detection location, and the other of which directs light of the second wavelength emitted from the second emission location for transmission in the given one of the respective directions and also directs light of the first wavelength received from the given one of the respective directions toward the first detection location.

5. The optical communication terminal of claim 1, further comprising:
an orientation feedback sensor including a photo-sensitive array situated to be illuminated by at least some light reflected by the steering mirror; and
a controller configured to: (i) obtain a measurement of light illuminating the photo-sensitive array, and (ii) cause the orientation of the steering mirror to change based on the obtained measurement.

6. The optical communication terminal of claim 5, wherein the controller is further configured to: (i) determine a centroid position, on the photo-sensitive array, of the illuminating light, and (ii) change the orientation of the steering mirror so as to align the centroid position with one of a first target position or a second target position, wherein the first and second target positions correspond to the first and second orientations of the steering mirror, respectively.

7. The optical communication terminal of claim 5, further comprising:
an alignment laser source configured to emit laser light of a third wavelength that is directed toward the steering mirror for transmission toward the remote terminal; and
at least one additional beam splitter configured to separate received light of the third wavelength from light of the first and second wavelengths, wherein the additional beam splitter is arranged such that the light of the third wavelength received from the remote terminal is directed toward the photo-sensitive array of the orientation feedback sensor.

8. The optical communication terminal of claim 1,
wherein a first pair of optical paths alternately traversed by light of the first wavelength includes a reception path defined between the steering mirror and the first detection location and a transmission path defined between the steering mirror and the first emission location,
wherein a second pair of optical paths alternately traversed by light having the second wavelength includes a reception path defined between the steering mirror and the second detection location and a transmission path defined between the steering mirror and the second emission location, and
wherein an angular separation between the first pair of optical paths is approximately equal to an angular separation between the second pair of optical paths.

9. The optical communication terminal of claim 1, further comprising a frame to which the beam splitter, the steering mirror, the first and second emission locations, and the first and second detection locations are mounted.

10. The optical communication terminal of claim 1, wherein the one or more light sources include:
    a first laser light source configured to emit data modulated laser light of the first wavelength; and
    a second laser light source configured to emit data modulated laser light of the second wavelength.

11. The optical communication terminal of claim 1, wherein the one or more detectors include:
    a first avalanche photodiode configured to detect data modulated laser light of the first wavelength; and
    a second avalanche photodiode configured to detect data modulated laser light of the second wavelength.

12. The optical communication terminal of claim 1, further comprising:
    multiple optical fibers that optically link the one or more light sources to each of the first and second emission locations and the one or more detectors to each of the first and second detection locations.

13. The optical communication terminal of claim 1, further comprising:
    a first wavelength-selective filter configured to transmit light having the first wavelength, and not transmit light having the second wavelength, wherein the first wavelength-selective filter is situated between the beam splitter and both the first emission location and the first detection location; and
    a second wavelength-selective filter configured to transmit light having the second wavelength, and not transmit light having the first wavelength, wherein the second wavelength-selective filter is situated between the beam splitter and both the second emission location and the second detection location.

14. The optical communication terminal of claim 1, wherein the optical communication terminal is configured to be mounted to a payload of a high altitude platform.

15. A high altitude aerial vehicle comprising:
    an envelope;
    a payload configured to be suspended from the envelope; and
    an optical communication terminal mounted to the payload, the optical communication terminal comprising: (i) a beam splitter configured to transmit light of a first wavelength and to reflect light of a second wavelength; (ii) one or more light sources configured to emit light of the first wavelength from a first emission location and to emit light of the second wavelength from a second emission location; (iii) one or more detectors configured to detect, at a first detection location, light of the first wavelength, and to detect, at a second detection location, light of the second wavelength; and (iv) a steering mirror,
    wherein the steering mirror and the beam splitter are arranged such that, while the steering mirror has a first orientation, (i) light of the first wavelength that is emitted from the first emission location is directed for transmission toward a remote terminal, and (ii) light of the second wavelength that is received from the remote terminal is directed toward the second detection location, and
    wherein the steering mirror and the beam splitter are further arranged such that, while the steering mirror has a second orientation, (i) light of the second wavelength that is emitted from the second emission location is directed for transmission toward the remote terminal, and (ii) light of the first wavelength received from the remote terminal is directed toward the first detection location.

16. The high altitude aerial vehicle of claim 15, further comprising:
    a controller configured to: (i) make a determination to switch between modes of full duplex communication; and (ii) responsive to making the determination, cause the orientation of the steering mirror to change between the first orientation and the second orientation.

17. The high altitude aerial vehicle of claim 16, wherein the controller is further configured to:
    while the steering mirror has the first orientation, operate the optical communication terminal in a first mode of full duplex communication by: (i) causing the one or more light sources to emit light of the first wavelength from the first emission location, modulated based on output data, and (ii) extracting input data based on light of the second wavelength, detected by the one or more detectors at the second detection location; and
    while the steering mirror has the second approximate orientation, operate the optical communication terminal in a second mode of full duplex communication by: (i) causing the one or more light sources to emit light of the second wavelength from the second emission location, modulated based on output data, and (ii) extracting input data based on light of the first wavelength, detected by the one or more detectors at the first detection location.

18. A method comprising:
    orienting a steering mirror in a first orientation so as to: (i) receive light of a first wavelength that is directed by a beam splitter from a first emission location toward the steering mirror, and direct the received light of the first wavelength toward a remote terminal, and (ii) direct incident light of a second wavelength received from the remote terminal toward the beam splitter for reflection from the beam splitter towards a second detection location;
    conducting full duplex communication in a first mode by: (i) emitting light of the first wavelength from the first emission location, modulated based on output data, and (ii) extracting input data based on light of the second wavelength, detected at the second detection location;
    making a determination to switch to conducting full duplex communication in a second mode;
    responsive to making the determination, orienting the steering mirror in a second orientation so as to: (i) receive light of the second wavelength that is directed by the beam splitter from a second emission location toward the steering mirror, and direct the received light of the second wavelength emitted toward the remote terminal, and (ii) direct incident light of the first wavelength received from the remote terminal toward the beam splitter for transmission from the beam splitter towards a first detection location; and
    conducting full duplex communication in the second mode by: (i) emitting light of the second wavelength from the second emission location, modulated based on output data, and (ii) extracting input data based on light of the first wavelength, detected at the first detection location.

19. The method of claim 18, further comprising:
    measuring at least some light reflected by the steering mirror so as to illuminate a photo-sensitive array; and
    causing the orientation of the steering mirror to change based on the measurement.

20. The method of claim 19, wherein causing the orientation of the steering mirror to change based on the measurement comprises:
- determining a centroid position, on the photo-sensitive array, of the illuminating light;
- changing the orientation of the steering mirror so as to align the centroid position with one of a first target position or a second target position, wherein the first and second target positions correspond to respective orientations of the steering mirror in which the steering mirror is aligned for conducting full duplex communication in the first and second mode, respectively.

* * * * *